(12) United States Patent
Asensio Cotillas

(10) Patent No.: US 12,716,438 B2
(45) Date of Patent: Aug. 25, 2026

(54) CAM FOR A BASE FOR TRANSPORT

(71) Applicant: CABKA Group GmbH, Berlin (DE)

(72) Inventor: Luis Asensio Cotillas, Valencia (ES)

(73) Assignee: CABKA Group GmbH, Berlin (DE)

( * ) Notice: Subject to any disclaimer, the term of this patent is extended or adjusted under 35 U.S.C. 154(b) by 399 days.

(21) Appl. No.: 18/195,427

(22) Filed: May 10, 2023

(65) Prior Publication Data

US 2023/0366419 A1 Nov. 16, 2023

(30) Foreign Application Priority Data

May 10, 2022 (EP) .................................... 22172632

(51) Int. Cl.
*F16B 21/04* (2006.01)
*F16B 2/18* (2006.01)
*F16B 5/10* (2006.01)

(52) U.S. Cl.
CPC .................. *F16B 2/18* (2013.01); *F16B 5/10* (2013.01); *F16B 21/04* (2013.01); *B65D 2519/00273* (2013.01)

(58) Field of Classification Search
CPC .......... F16B 5/10; F16B 21/02; F16B 5/0208; F16B 21/04
USPC .......................................... 411/349, 549, 553
See application file for complete search history.

(56) References Cited

U.S. PATENT DOCUMENTS 847,253 A * 3/1907 Iversen ..................... A41F 1/00 24/DIG. 59
1,809,117 A * 6/1931 Golden .................. B61D 25/00 49/456
1,895,672 A * 1/1933 Loughman ............... B60K 5/00 411/347
5,862,917 A * 1/1999 Noble .................... B65D 19/18 206/600
6,237,970 B1 * 5/2001 Joannou .................. F16B 21/09 292/241
6,267,543 B1 * 7/2001 David ..................... F16B 21/02 411/549
6,763,745 B2 * 7/2004 Morasse ................. F16B 21/04 81/436
7,537,409 B2 * 5/2009 Huhnerbein ........ F16B 12/2009 403/348
9,562,555 B1 * 2/2017 Talbot ................... F16B 5/0056
11,252,939 B2 * 2/2022 Winekoff ................. A61D 9/00
12,140,170 B2 * 11/2024 Wang ........................ F16B 2/18
2011/0255935 A1 10/2011 Chen et al.
2015/0245521 A1 8/2015 Cheng et al.

FOREIGN PATENT DOCUMENTS

| | | |
|---|---|---|
| CN | 210068695 | 2/2020 |
| DE | 3324762 | 1/1985 |
| WO | WO 2018/082618 | 5/2018 |

OTHER PUBLICATIONS

European Search Report and the European Search Opinion Dated Nov. 7, 2022 From the European Patent Office Re. Application No. 22172632.6. (9 Pages).

* cited by examiner

*Primary Examiner* — Flemming Saether

(57) ABSTRACT

The present invention relates to a cam, comprising a head, a body connected to said head and a leg comprising one or more flat bodies extending perpendicular to said body, where said cam further comprises at least one compressible isolation element located below said head and extending at least partially around said body.

15 Claims, 41 Drawing Sheets

FIG. 3A
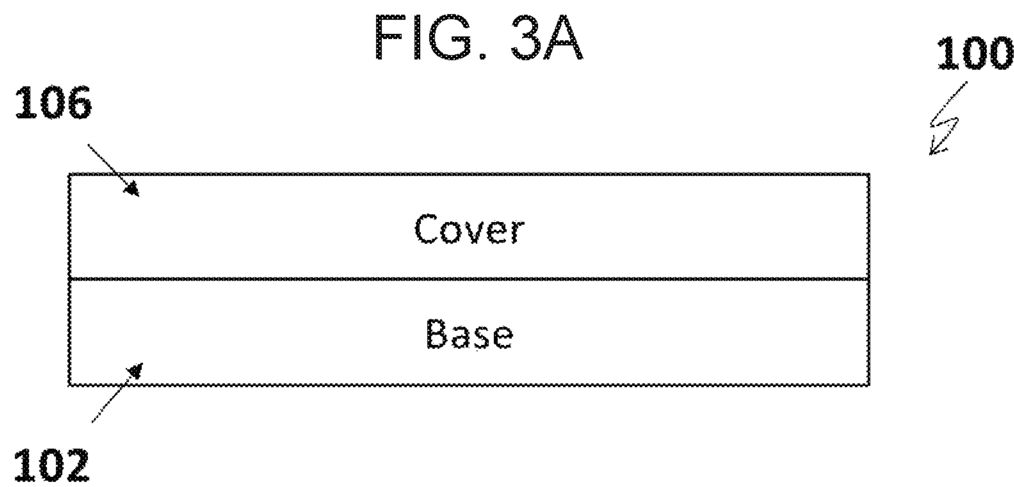
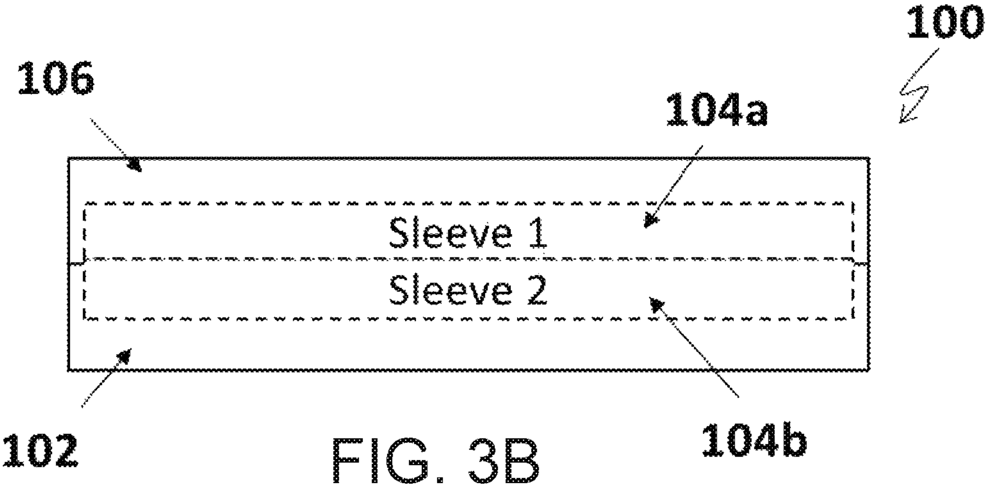
FIG. 3B
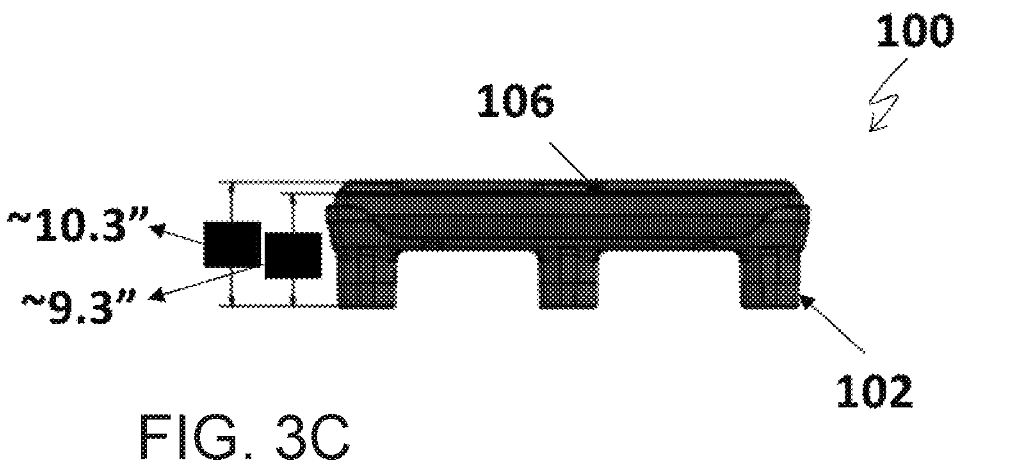
FIG. 3C 106
104a
102
104b
1002/1004
2502
106
102
2302

406c
102
402
406d
406b
406a
406a
406b
102
404

2504

FIG. 6A (Prior Art)
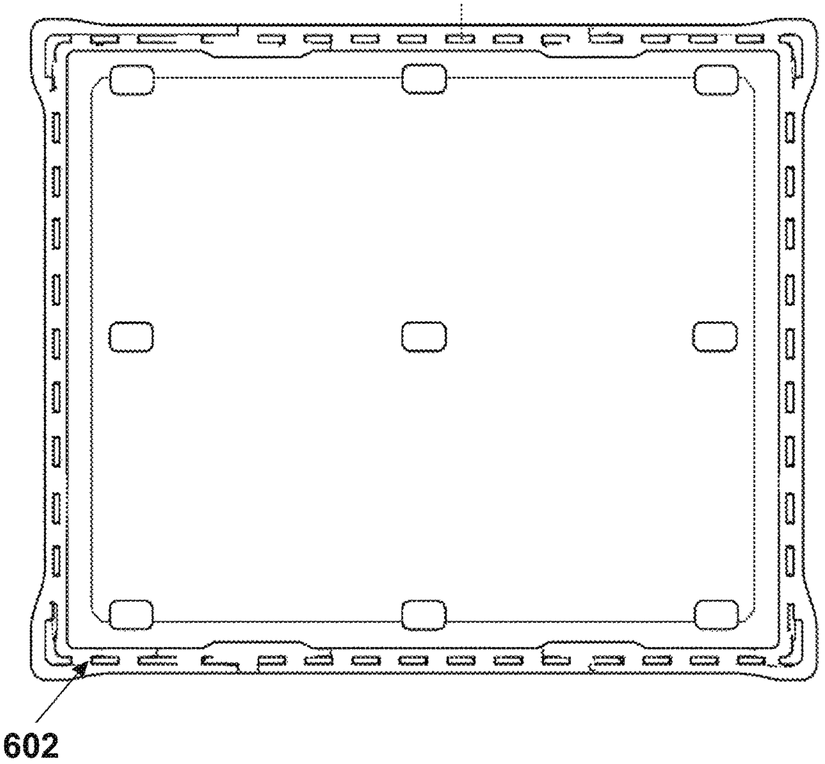
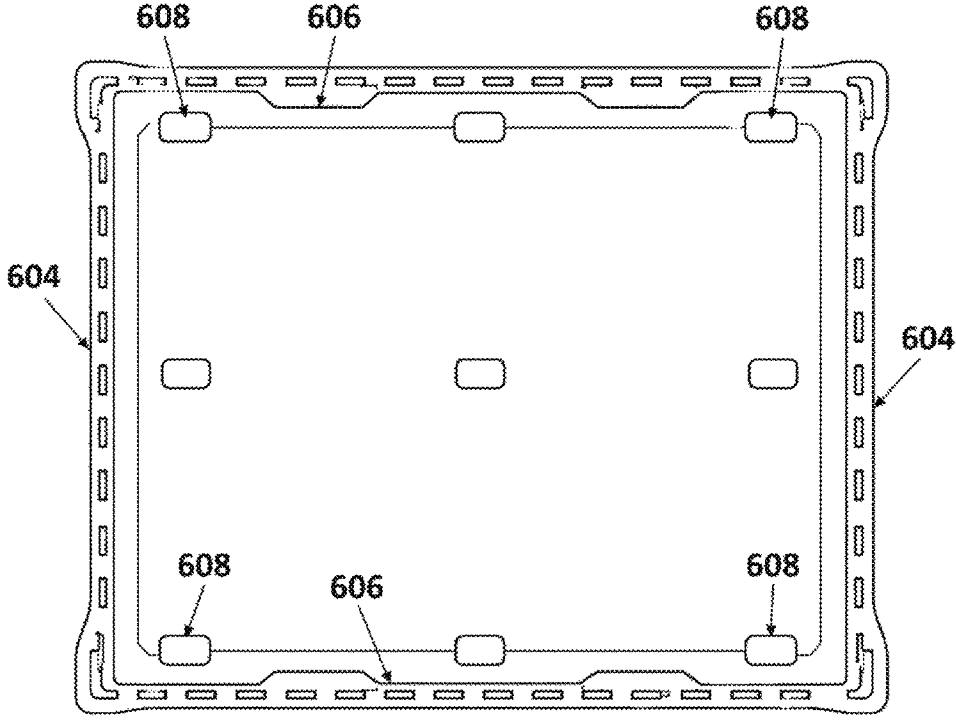
FIG. 6B

FIG. 8A
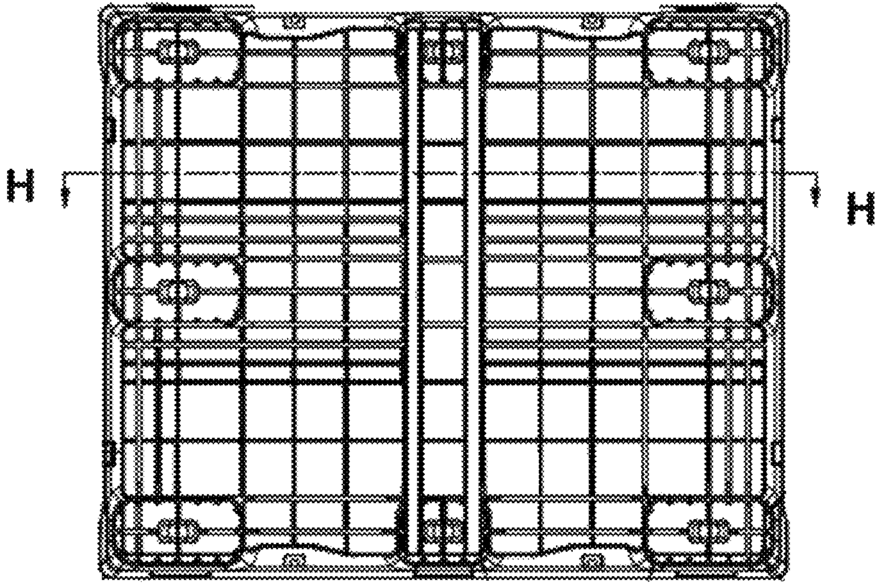
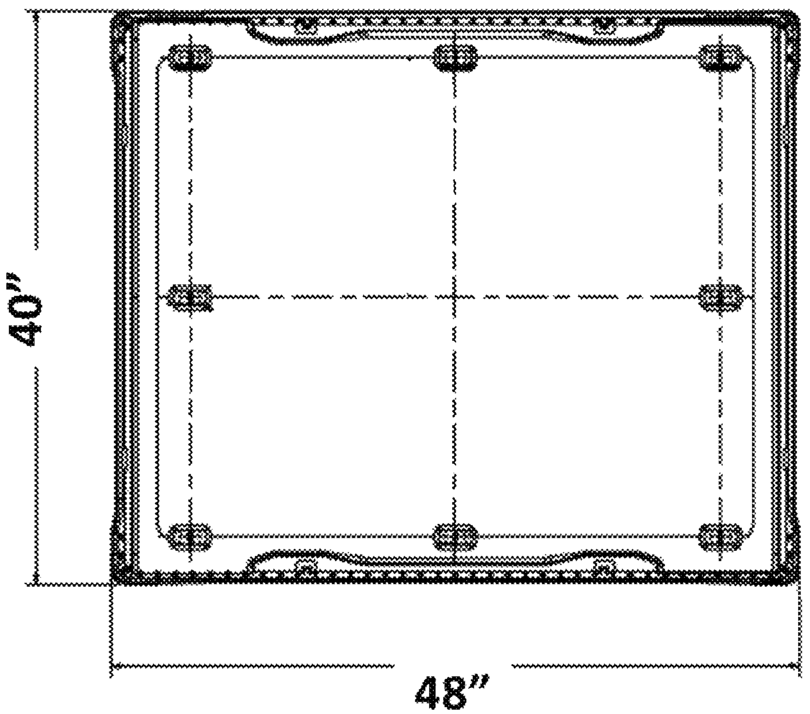
FIG. 8B

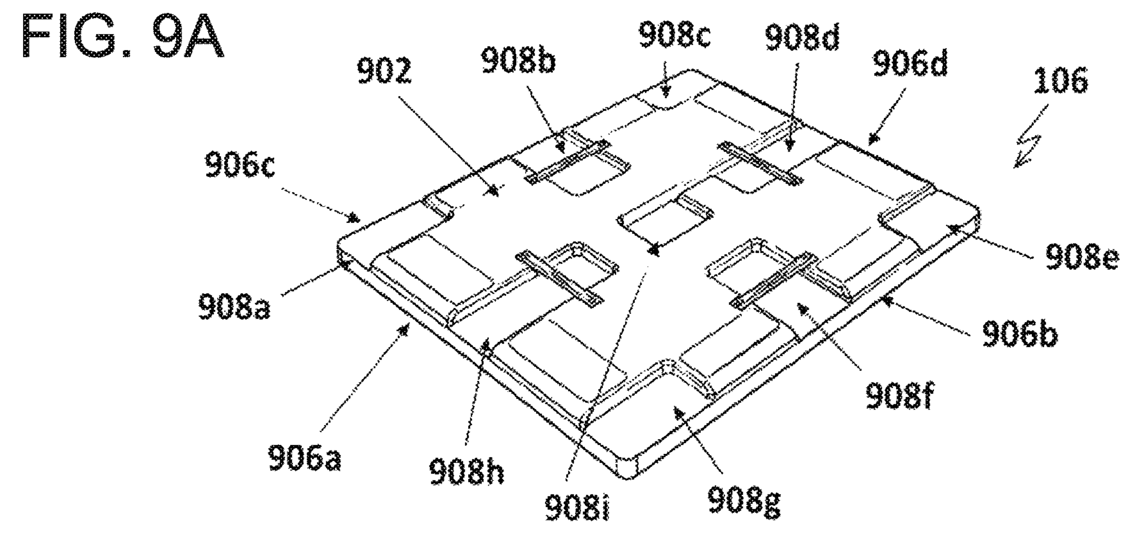
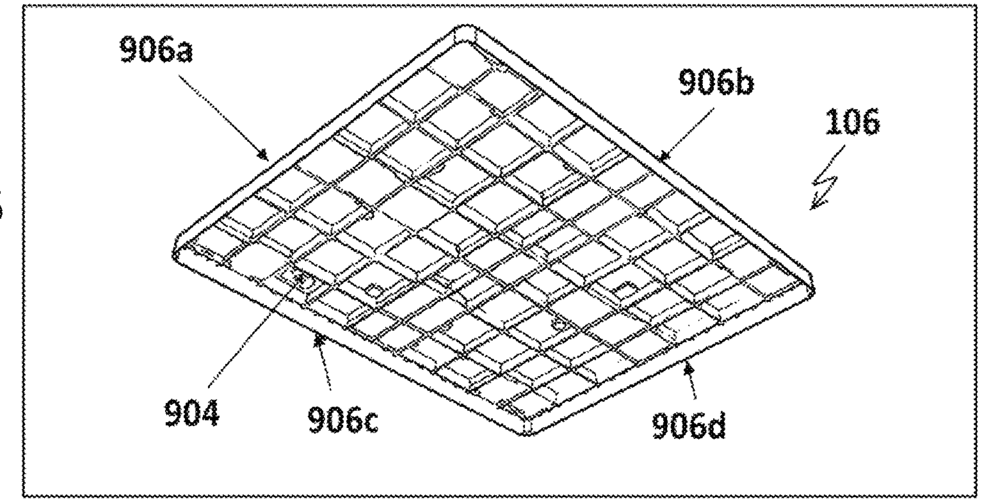
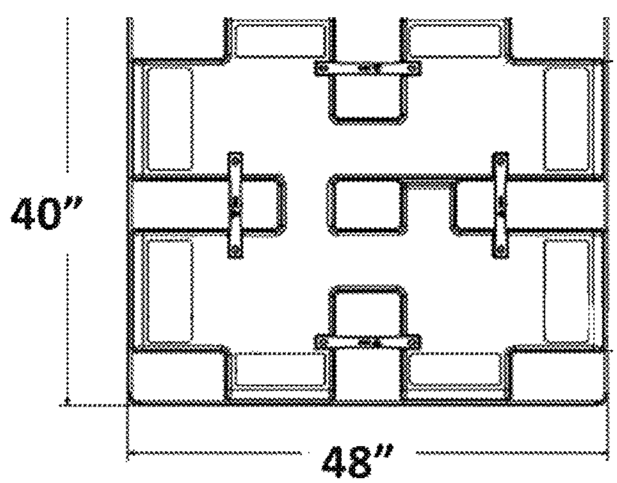
FIG. 9C

FIG. 14

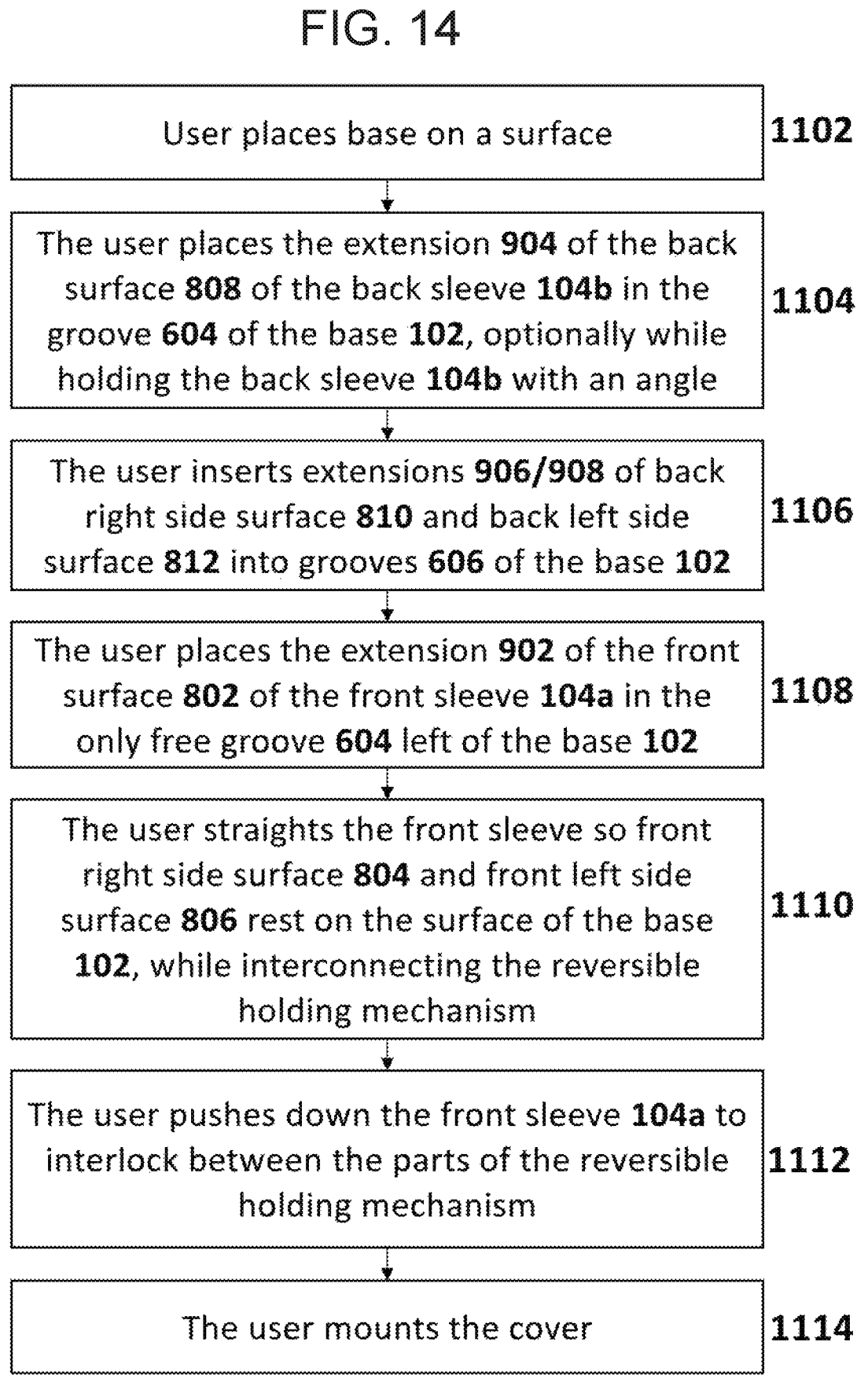

User places base on a surface 1102

The user places the extension 904 of the back surface 808 of the back sleeve 104b in the groove 604 of the base 102, optionally while holding the back sleeve 104b with an angle 1104

The user inserts extensions 906/908 of back right side surface 810 and back left side surface 812 into grooves 606 of the base 102 1106

The user places the extension 902 of the front surface 802 of the front sleeve 104a in the only free groove 604 left of the base 102 1108

The user straights the front sleeve so front right side surface 804 and front left side surface 806 rest on the surface of the base 102, while interconnecting the reversible holding mechanism 1110

The user pushes down the front sleeve 104a to interlock between the parts of the reversible holding mechanism 1112

The user mounts the cover 1114

FIG. 23B
FIG. 23A
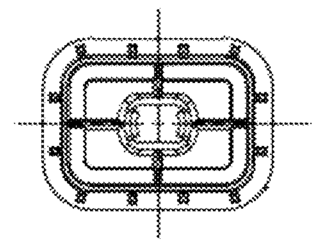
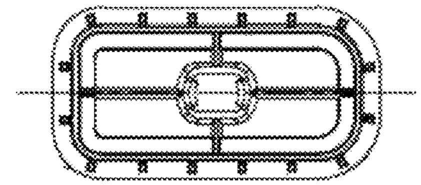
FIG. 23C
FIG. 23D
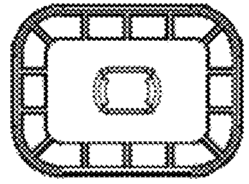
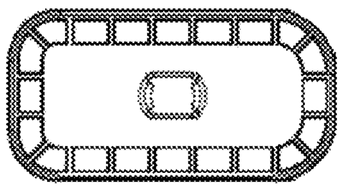
FIG. 23E
FIG. 23F
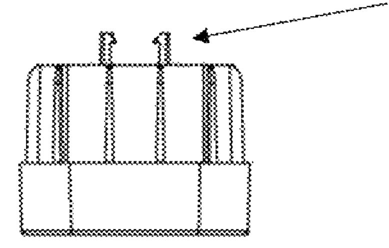
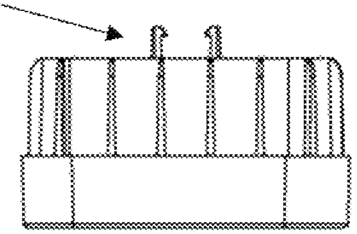

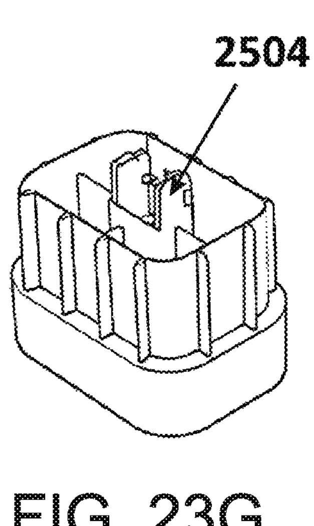
FIG. 23G
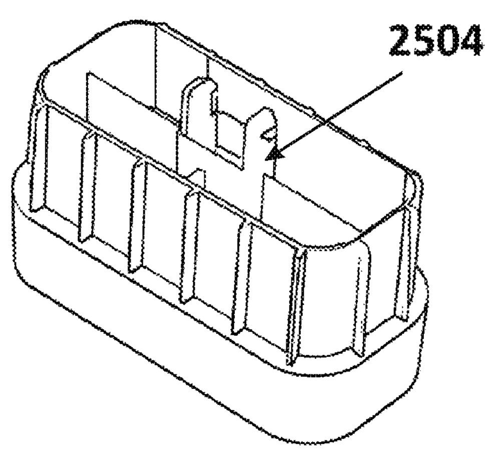
FIG. 23H
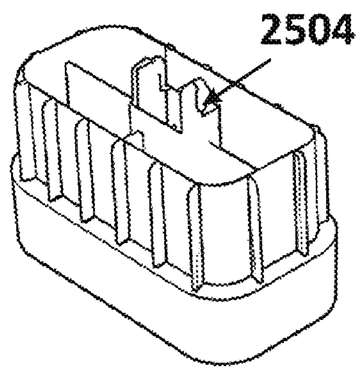
FIG. 23i
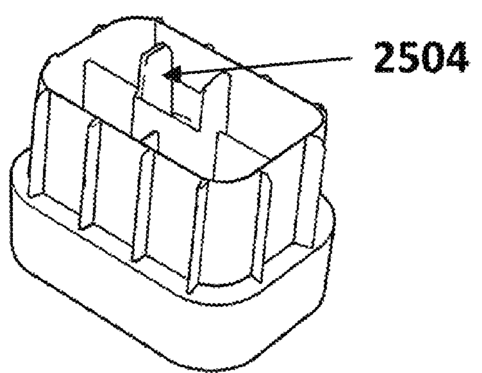
FIG. 23J 10.37"

DETAIL A
SCALE 5 : 1
R1.00
0.50
R22.50
R29.00
SECTION F-F
SECTION E-E
SECTION B-B
16.3
3.55
R11.00
R6.00
Ø22.00
A
F
F
9.00
48.50
90°
2.00
2.00
34.00

CAM FOR A BASE FOR TRANSPORT

RELATED APPLICATIONS

This application claims the benefit of priority of European Patent Application No. 22172632.6, filed on May 10, 2022, the contents of which are all incorporated by reference as if fully set forth herein in their entirety.

FIELD AND BACKGROUND OF THE INVENTION

The present invention, in some embodiments thereof, relates to a cam for a base for transporting goods and, more particularly, but not exclusively, to a cam for a base for transporting goods comprising an isolation element.

Returnable bulk containers come in two general classifications: sleeve packs and knock downs. A sleeve pack includes a pallet or a base, a sleeve and a top cap. Sleeve packs are the most commonly used returnable bulk container in Europe, South East Asia, and South America. Engineered sleeve packs have superior shipping efficiency, hygienics, ergonomics, and reverse logistics, making them the best bulk solution for many applications. Specifically, sleeve packs provide: Shipping Efficiency maximum amount of product per trailer load; Reverse Logistics require less return freight; Hygienics can be cleaned and sanitized (required for pharma, medical, caps and closures, and food); and Safety and Ergonomics often safer, easier to use.

Additional background art includes European patent EP2328814B1 disclosing a large container comprising a base part and at least one foot element releaseably attached to the base part by means of at least one bayonet-like fastening element.

International application publication No. WO2018082618A1 disclosing a connector, which comprises a main body, where an end of the main body is provided with an elastic rotary snap-connecting portion, which is used for snap-connecting an object-supporting carrier board by means of rotation, and another end of the main body is provided with a screw-locking portion, which is used for snap-locking the object-supporting carrier board and which may correspondingly drive the main body to rotatingly snap locked by means of a screw-locking tool.

Chinese application N. CN105673631A disclosing a rotary nail and rotary nut fastener structure which comprises a rotary screw and a rotary nut. The rotary screw comprises a rotary screw head and a rotary screw rod. The rotary screw rod is provided with two protrusions which are opposite in position. The protrusions are located at the end, far from the rotary screw head, of the rotary screw rod. The rotary nut is provided with a mounting hole. The inner wall of the mounting hole is provided with two grooves which are opposite in position. Two clamping grooves which are opposite in position are formed in the positions, close to the end, of the mounting hole. The clamping grooves and the grooves are staggered in position. One end of each clamping groove communicates with the corresponding groove. When the rotary screw and the rotary nut are mounted, the rotary screw rod is inserted into the mounting hole, the rotary screw is rotated, and then the protrusions on the rotary screw rod are clamped into the clamping grooves in the rotary nut for connection and fixation.

U.S. Patent No. U.S. Pat. No. 4,657,462 disclosing an industrial quarter-turn fastener assembly that comprises a sheet metal turn member having a turn head, a shank portion and a nose portion; a cap member through which the shank portion extends; and a helical coil spring. In one embodiment the fastener assembly is a blind fastener which is tilted to pass through a hole in a first panel which hole is smaller than the width of the nose portion and in another embodiment the shank portion is held to the first panel by a locking ring. To secure a second panel to the first panel, the nose portion is pushed through a slot hole in the second panel and the fastener turn head is rotated a quarter turn.

Korean patent application No. KR20020094252A disclosing an apparatus for fastening or separating a container twist lock to a corner frame of a container for goods transportation comprises a base frame for supporting the loaded container such a fashion that the container twist lock is exposed downward; a twist lock fastening or separating unit; and a loading/unloading unit for loading/unloading the twist lock to the twist lock fastening or separating unit.

U.S. patent application No. US20100108830A1 disclosing a support stand for display device includes a base seat, an elevating support, and a locking module detachably connected the elevating support to the base seat. The locking module includes a fixing member, a rotating member, an elastic member, and a latching member. The fixing member is fixed on one of the base seat and the elevating support, and the fixing member defines a gap and a latching groove. The rotating member is rotatably extended through the other one of the base seat and the elevating support, and the fixing member. The elastic member is sleeved on the rotating member, and abuts on the fixing member. The latching member is fixed on an end of the rotating member. The latching member is extended through the gap of the fixing member, and is engaged in the latching groove of the fixing member.

U.S. patent application No. US20160039566A1 disclosing a transport pallet made from plastic material, comprising a cover plate forming a support surface for goods to be received, and a base element and support elements between the cover plate and the base element, where the support elements are formed separately or as a part of the cover plate and/or the base element and connect the cover plate and the base element with one another at a distance from one another or form openings between one another for an engagement of lifting devices, in particular for an engagement of fork prongs of a forklift, characterized in that the cover plate and the base element are connected with one another by closure elements which are respectively formed with a rated breaking point.

U.S. patent application No. US20050220568A1 disclosing a fastening component for fastening together a first component and a second component used in a plasma processing tool. The fastening component includes a first surface configured to be exposed to plasma processing performed in the plasma processing tool, and a second surface configured to contact the first component. Also included is a stem extending from the second surface and configured to at least partially protrude through the first component and the second component. The fastening component further includes a locking pin extending from at least one side of the stem and configured to contact the second component. The first surface, the second surface, the stem, and/or the locking pin are made of or coated with a material that is highly resistant to erosion resulting from plasma processing.

Chinese patent No. CN2578590Ydisclosing a fixing device for a plate and a pipe, which comprises a body and a knob. The body is a fixing component forming a streamline modeling, both sides of the top of the body are respectively provided with a clamping groove, and the center of the body is provided with a hollow inserting hole. The knob is composed of a rotary disk and a hollow shaft rod which is penetrated through the top of the rotary disk and extended out of the bottom of the rotary disk. The clamping groove can be used for insertion of the plate, and the hollow shaft rod can be used for insertion of the pipe. The fixing device for a plate and a pipe can be quickly elastically applied to form an observing plate or an article placing rack.

U.S. Patent No. U.S. Pat. No. 3,816,882 disclosing a clamping unit comprising a member (A) having a cylindrical portion adapted to be inserted into a through-hole formed in a wall of a packaging box, a flange portion adapted to be closely fitted over the peripheral edge of said through-hole, an axial through-hole and grooves circumferentially formed in the end surface of said cylindrical portion or the front surface of said flange portion along the peripheral edge of said through-hole;

and a member (B) having a cylindrical portion adapted to be inserted into a through-hole formed in the confronting wall of another packaging box, a flange portion adapted to be fitted over the peripheral edge of said through-hole, engaging projections adapted to be inserted into the axial through-hole of said member (A) and locking means adapted to ‘elastically engage the end surface of the cylindrical portion or the inner peripheral surface of the axial through-hole of said member (A), said member (B) being inserted into said member (A), whereby the locking means of said member (B) are strongly elastically forced into the grooves of said member (A) and said member (A) is disengageably positively secured to said member (B).

International application publication No. WO2022007914A1 disclosing a stand column and a tray using same. The stand column has a columnar body. At least two top bosses protruding out of the top surface of the columnar body are arranged at the periphery of the top of the columnar body. Stand column mounting holes which penetrate up and down in the central axis direction of the columnar bod are formed in the columnar body at the at least two top bosses. The tray comprises a top plate, a bottom plate, and a plurality of stand columns. The top plate, the stand columns and the bottom plate are sequentially connected from top to bottom.

U.S. patent application No. US20150063950A1 disclosing an assembly of boards that includes a first board, a second board and a lock member. The first board includes a first through hole and a gap formed on a bottom of the first board. The second board includes a supporting wall formed on a bottom thereof, a second through hole corresponding to the first through hole, and a receiving hole defined in the first board and communicating with the second through hole. The lock member includes a head rotatably received in the receiving hole and being blocked by the supporting wall, a neck connected to the head, and a latch portion formed on the neck, the latch portion extending through the first and second through holes and able to be rotatably abutted so as to latch against the bottom of the first board.

U.S. Patent No. U.S. Pat. No. 3,753,272 disclosing an apparatus for releasably locking large ocean-type vertically stacked cargo containers to each other. A body is disposed between the containers, spaces the containers apart and is fitted with a cone that can be rotated from an open position into a locked position in which the cone engages an undercut in corner fittings of the container by actuating a handle that protrudes horizontally through a slot-like opening in a side of the body. The body is also fitted with means to secure it to a corner fitting of the lower container at least while the cone locks the upper container to the body.

U.S. patent application No. US20180003208A1 disclosing a two-piece pallet fastener for securing a pallet element to a base pallet. The fastener includes a sleeve internal, male protrusions and a rivet having external, female threads. The sleeve is installed in a pallet base and the rivet is inserted through the part to be attached to the pallet base and into the sleeve. The sleeve includes a rivet-receiving end having an alignment feature and an anchoring end. The anchoring end includes flexible legs having external shoulders. The rivet includes a head and a shaft. The head includes an alignment feature. The shaft includes external, female threads and two or more axially-aligned longitudinal grooves. One or more detents are formed on the rivet for engagement with the interior surface of the sleeve. The detents are provided to produce a ratchet-type effect to assure that the rivet is locked into the sleeve.

U.S. Patent No. U.S. Pat. No. 5,062,752 disclosing a container coupling device for coupling upper and lower containers together in a simple and reliable manner to allow for reliable transport of stacked containers. The container coupling device includes a rotation restriction mechanism provided between a lower insertion shank and a lower engaging body. The lower engaging body is formed on upper and lower sides with tapered surfaces. A rotary shaft has a spring to bias the lower engaging body in a locking direction. The rotation restriction mechanism serves to temporarily prevent the lower engaging body from turning in the locking direction. This rotation restriction action can be released by additional turning torque in the locking direction. Such torque is produced when the upper or lower tapered surfaces engage with an engaging hole in the container. Upon release of the restriction mechanism, the spring will turn the lower engaging body toward the locking position. After the coupling device is engaged in the bottom of a container, the engaging body is lowered into an engaging hole in a lower container. The engaging body automatically turns toward the locking position to couple the containers together. To disconnect the containers, the lever is turned back to where the turn restriction mechanism becomes operative, and the upper container is lifted. When the upper tapered surfaces engage the engaging hole, the lower engaging body will align with the insertion shanks to allow extraction of the coupling device from the engaging hole.

SUMMARY OF THE INVENTION

Following is a non-exclusive list including some examples of embodiments of the invention. The invention also includes embodiments which include fewer than all the features in an example and embodiments using features from multiple examples, also if not expressly listed below.

Example 1. A cam, comprising:

a. a head;

b. a body connected to said head; and c. a leg comprising one or more flat bodies extending perpendicular to said body;

wherein said cam further comprises at least one compressible isolation element located below said head and extending at least partially around said body.

Example 2. The cam according to example 1, further comprising a locking mechanism located in said leg.

Example 3. The cam according to example 1 or example 2, wherein said locking mechanism comprises at least one protrusion located on a surface of said one or more flat bodies, said at least one protrusion facing said head.

Example 4. The cam according to any one of examples 1-3, wherein said at least one protrusion of said locking mechanism is configured to enter at least one groove in a cam housing.

Example 5. The cam according to any one of examples 1-4, wherein said at least one compressible isolation element is configured to compress a distance of from about 0.5 mm to about 3 mm.

Example 6. The cam according to any one of examples 1-5, wherein said at least one compressible isolation element is configured to compress a percentage of its own thickness of from about 20% to about 60%.

Example 7. The cam according to any one of examples 1-6, wherein said at least one compressible isolation element extends completely around said body.

Example 8. The cam according to any one of examples 1-7, wherein said body is an elongated cylindrical body.

Example 9. The cam according to any one of examples 1-8, wherein said head comprises one or more grooves on a surface of said head for allowing actuation of said cam by a user.

Example 10. The cam according to any one of examples 1-9, wherein said one or more flat bodies extend perfectly perpendicular to said body.

Example 11. The cam according to any one of examples 1-10, wherein said cam is used in a transport system to hold one or more components to said transport system.

Example 12. The cam according to any one of examples 1-11, wherein said cam is made of one or more of the following materials Thermoplastic materials like: Polyolefins (reinforced or not), Poliamide (reinforced or not), and metallic materials like Aluminum, steel.

Example 13. The cam according to any one of examples 1-12, wherein said at least one compressible isolation element is made of one or more of the following materials Rubber, Silicone, EPDM, LDPE, TPE, TPV, and PUR.

Example 14. The cam according to any one of examples 1-13, wherein said one or more flat bodies are configured to translate over an angled surface of an opening of a cam housing.

Example 15. A locking system for components in a transportation system, comprising:

- a. a cam, comprising
  - i. a head;
  - ii. a body connected to said head; and
  - iii. a leg comprising one or more flat bodies extending perpendicular to said body;

wherein said cam further comprises at least one compressible isolation element located below said head and extending at least partially around said body;
- b. a cam housing, comprising:
  - iv. an elongated central opening configured to receive said cam;
  - v. one or more side openings configured to receive said one or more flat bodies extending perpendicular to said body of said cam;

wherein said one or more side openings comprise at least one angled surface configured to direct said one or more flat bodies towards said one or more side openings;
  - vi. at least one internal wall located at a determined distance according to a length of said cam so as to allow said at least one compressible isolation element located below said head to meet said at least one internal wall while said one or more flat bodies meet said one or more side openings.

Example 16. The locking system according to example 15, further comprising a locking mechanism located in said leg.

Example 17. The locking system according to example 15 or example 16, wherein said locking mechanism comprises at least one protrusion located on a surface of said one or more flat bodies, said at least one protrusion facing said head.

Example 18. The locking system according to any one of examples 15-17, wherein said one or more side openings comprise at least one groove.

Example 19. The locking system according to any one of examples 15-18, wherein said at least one protrusion of said locking mechanism is configured to enter said at least one groove in said cam housing.

Example 20. The locking system according to any one of examples 15-19, wherein said at least one compressible isolation element is configured to compress a distance of from about 0.5 mm to about 3 mm.

Example 21. The locking system according to any one of examples 15-20, wherein said at least one compressible isolation element is configured to compress a percentage of its own thickness of from about 20% to about 60%.

Example 22. The locking system according to any one of examples 15-21, wherein said at least one compressible isolation element extends completely around said body.

Example 23. The locking system according to any one of examples 15-22, wherein said body is an elongated cylindrical body.

Example 24. The locking system according to any one of examples 15-23, wherein said head comprises one or more grooves on a surface of said head for allowing actuation of said cam by a user.

Example 25. The collapsible container according to any one of examples 15-24, wherein said one or more flat bodies extend perfectly perpendicular to said body.

Example 26. The collapsible container according to any one of examples 15-25, wherein said cam is made of one or more of the following materials Thermoplastic materials like: Polyolefins (reinforced or not), Poliamide (reinforced or not), and metallic materials like Aluminum, steel.

Example 27. The collapsible container according to any one of examples 15-26, wherein said at least one compressible isolation element is made of one or more of the following materials Rubber, Silicone, EPDM, LDPE, TPE, TPV, and PUR.

Example 28. The collapsible container according to any one of examples 15-27, wherein said one or more side openings comprise an angled surface configured to receive said one or more flat bodies and further configured to assist directing said one or more flat bodies into said one or more side openings.

Example 29. A method of actuating a cam in a cam housing in a transport system, the method comprising:

- a. inserting said cam into said cam housing;
- b. pushing said cam into said cam housing to cause a compression of an isolation element in said cam;
- c. rotating said cam;
- d. releasing said cam;
- e. allowing decompression of said isolation element, which actuates a locking mechanism between said cam and said cam housing.

Example 30. A flat cam, comprising:

- a. a body comprising an opening at the center of said body;

b. one or more protrusions extending internally in said opening configured to lock said flat cam in position;

wherein said cam further comprises at least one compressible isolation element located on a bottom surface of said body and extending at least partially around said bottom surface of said body.

Example 31. The flat cam according to example 30, further comprising a protruding body on said bottom surface of said body and extending around said opening.

Example 32. The flat cam according to example 30 or example 31, wherein said at least one compressible isolation element is configured to compress a distance of from about 0.5 mm to about 3 mm.

Example 33. The flat cam according to any one of examples 1-3, wherein said at least one compressible isolation element is configured to compress a percentage of its own thickness of from about 20% to about 60%.

Example 34. The flat cam according to any one of examples 1-4, wherein said at least one compressible isolation element extends completely on said bottom surface of said body.

Example 35. The flat cam according to any one of examples 1-5, wherein said body is a round body.

Example 36. The flat cam according to any one of examples 1-8, wherein said flat cam comprises one or more grooves on a top surface of said body for allowing actuation of said cam by a user.

Example 37. The flat cam according to any one of examples 1-10, wherein said cam is used in a transport system to hold one or more components to said transport system.

Example 38. The flat cam according to any one of examples 1-11, wherein said flat cam is made of one or more of the following materials Thermoplastic materials like: Polyolefins (reinforced or not), Poliamide (reinforced or not), and metallic materials like Aluminum, steel.

Example 39. The flat cam according to any one of examples 1-12, wherein said at least one compressible isolation element is made of one or more of the following materials Rubber, Silicone, EPDM, LDPE, TPE, TPV, and PUR.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3*a-c* are schematic overviews of exemplary components of an exemplary transport system in a folded configuration, according to some embodiments of the invention;

FIGS. 6*a-b* are schematic representations showing a comparison between features in a prior art and an feature in an exemplary base, according to some embodiments of the invention;

FIGS. 7*a-b* are schematic representations showing a perspective view comparison between features in a prior art and an feature in an exemplary base, according to some embodiments of the invention;

FIGS. 8*a-b* are schematic representations of sizes of exemplary bases, according to some embodiments of the invention;

FIGS. 9*a-c* are schematic representations of sizes of exemplary covers, according to some embodiments of the invention;

FIG. 14 is a schematic flowchart of an exemplary method of mounting the transport system, according to some embodiments of the invention;

FIGS. 21*a-c* are schematic illustrations of exemplary optional clips, according to some embodiments of the invention;

FIGS. 23*a-j* are schematic illustrations of exemplary elevating feet, according to some embodiments of the invention;

FIGS. 27*a-d* are schematic representations of the actions performed when installing the cam, according to some embodiments of the invention;

DESCRIPTION OF SPECIFIC EMBODIMENTS OF THE INVENTION

Figures 1A, 1B:
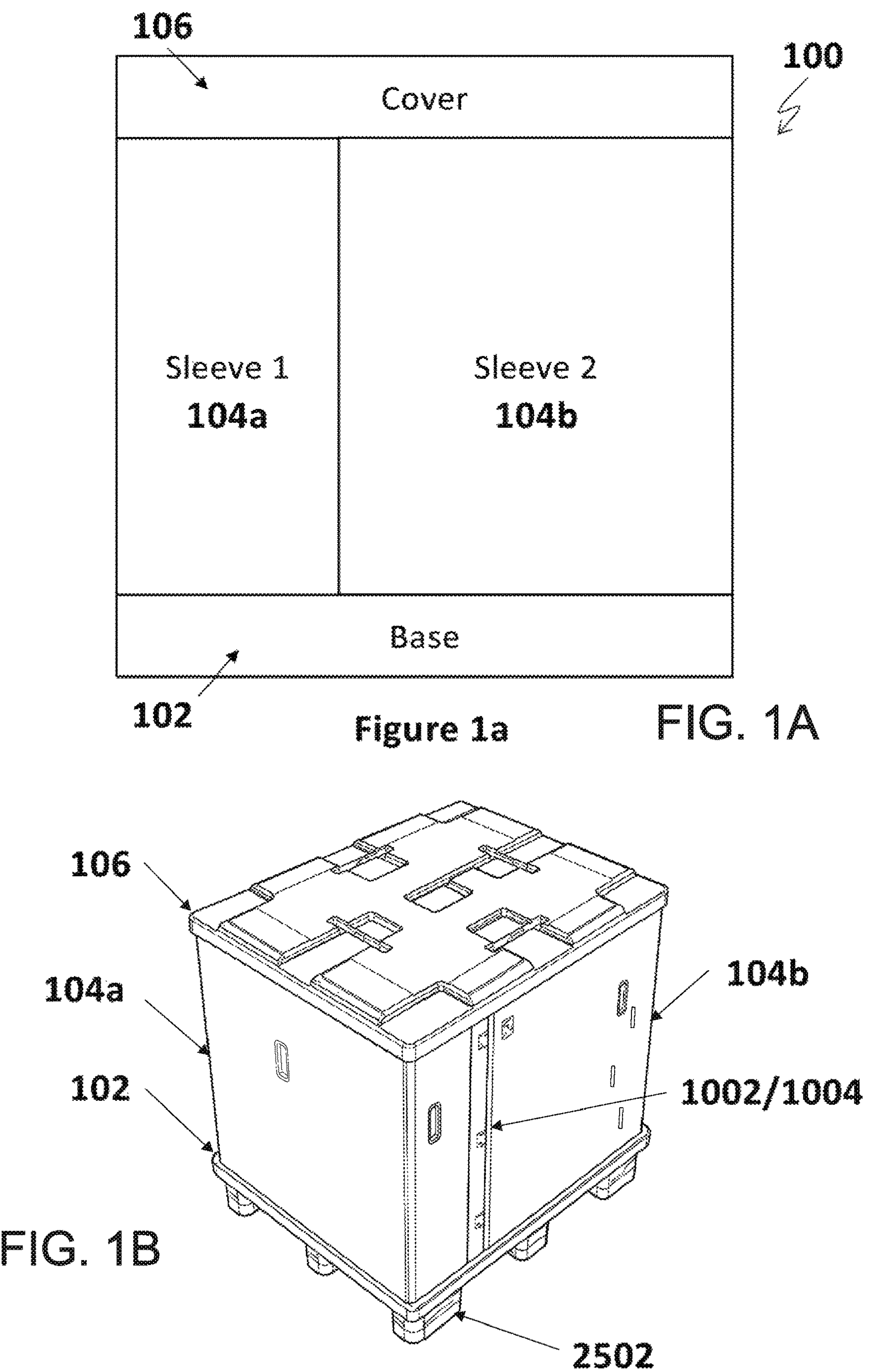
FIGS. 1*a* and 1*b* are schematic overviews of exemplary components of an exemplary transport system, according to some embodiments of the invention.

The present invention, in some embodiments thereof, relates to relates to a cam for a base for transporting goods and, more particularly, but not exclusively, to a cam for a base for transporting goods comprising an isolation element.

OVERVIEW

An aspect of some embodiments of the invention relates to a cam for reversibly attaching parts in a transport system. In some embodiments, the cam comprises an isolation element configured to isolate a zone of one part with another zone of another part. In some embodiments, a potential advantage of isolating between parts is that it potentially avoids the entering of external materials (for example liquids) from the outside of the transport system to the inside of the transport system. In some embodiments, the isolation element further provides counter pressure to the cam when installed to potentially avoid an unwanted release of the cam from the transport system. In some embodiments, the cam comprises a locking element configured to further assist in avoiding an unwanted release of the cam from the transport system. In some embodiments, the cam is configured to be reversibly installed into the transport system. In some embodiments, a potential advantage of providing a reversibly installable cam is that it potentially facilitates changing parts of the transport system when necessary.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Additionally, in order to provide a context for the use of the cam of the present invention, an exemplary transport system will be first explained. It should be understood that the following description of an exemplary transport system is just an example provided to allow a person having skills in the art to understand the invention and it is not intended to be limiting in any way. Therefore, it is part of the scope of the present invention to use the cam disclosed herein in any other transport system.

Referring now to FIGS. 1*a* and 1*b* illustrating a schematic overview of exemplary components of an exemplary transport system according to some embodiments of the invention. In some embodiments, the transport system 100 comprises a base 102, one or more sleeves 104*a-b* (in FIGS. 1*a-b* are shown 2 sleeves) and a cover 106. In some embodiments, the components of the transport system 100 comprise features for reversibly interconnecting the components, as will be further explained below. In some embodiments, the transport system comprises one sleeve. In some embodiments, the transport system comprises one or more sleeves irreversibly attached to the base.

In some embodiments, the transport system 100 comprises a plurality of states: a folded state, a partially deployed state and a fully deployed state.

In some embodiments, a fully deployed state is as schematically shown for example in FIGS. 1*a-b*, where the base 102, the sleeves 104*a-b* and cover 106 are all interconnected.

Figure 2A:
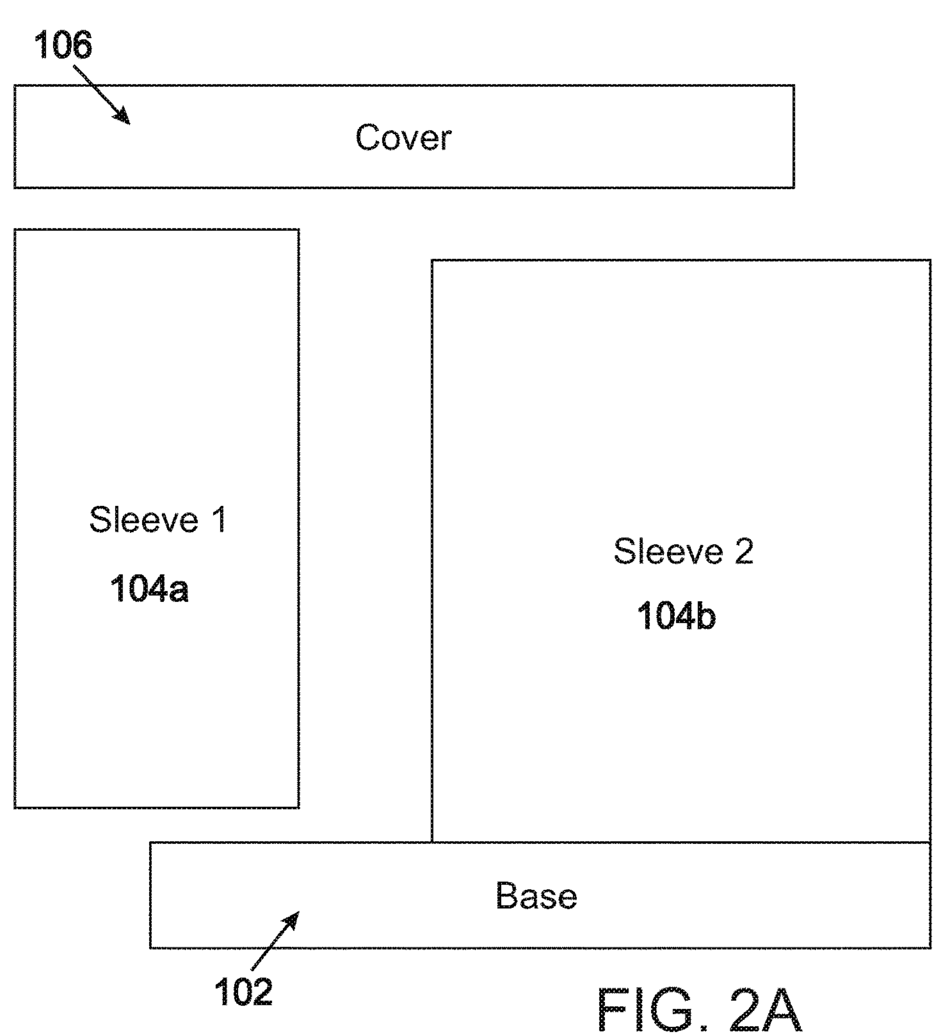
FIGS. 2*a* and 2*b* are schematic overviews of exemplary components of an exemplary transport system in a partially deployed configuration, according to some embodiments of the invention.
Figure 2B:
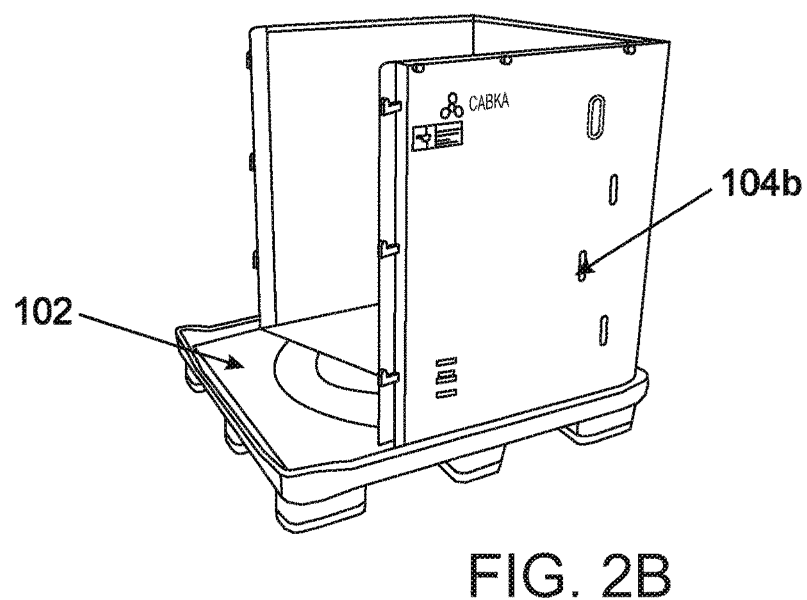

In some embodiments, a partially deployed transport system 100 is as schematically shown for example in FIGS. 2*a-b*, where at least one sleeve (in FIGS. 2*a-b* sleeve 104*b*) is interconnected to the base 102. FIG. 2*a* shows that sleeve 104*a* and cover 106 are not interconnected to the other parts of the transport system 100.

In some embodiments, a folded state is as schematically shown in FIGS. 3*a-c*, where base 102 and cover 106 are interconnected and the sleeves are folded and stored inside base 102 and cover 106. FIG. 3*a* shows base 102 and cover 106 interconnected, while FIG. 3*b* schematically shows the sleeves 104*a-b* folded and stored inside base 102 and cover 106. FIG. 3*c* shows exemplary heights of the system 100 in a folded state. In some embodiments, the total height of the system 100 in a folded state, which comprises the base 102, the folded sleeves on top of the base and the cover 106, is from about 10" (inch) to about 12". Optionally from about 9" to about 13". Optionally from about 8" to about 15". In some embodiments, the total height of the system 100 in a folded state without the cover is from about 9" (inch) to about 10". Optionally from about 8" to about 11". Optionally from about 7" to about 14".

Figures 3D, 3E:
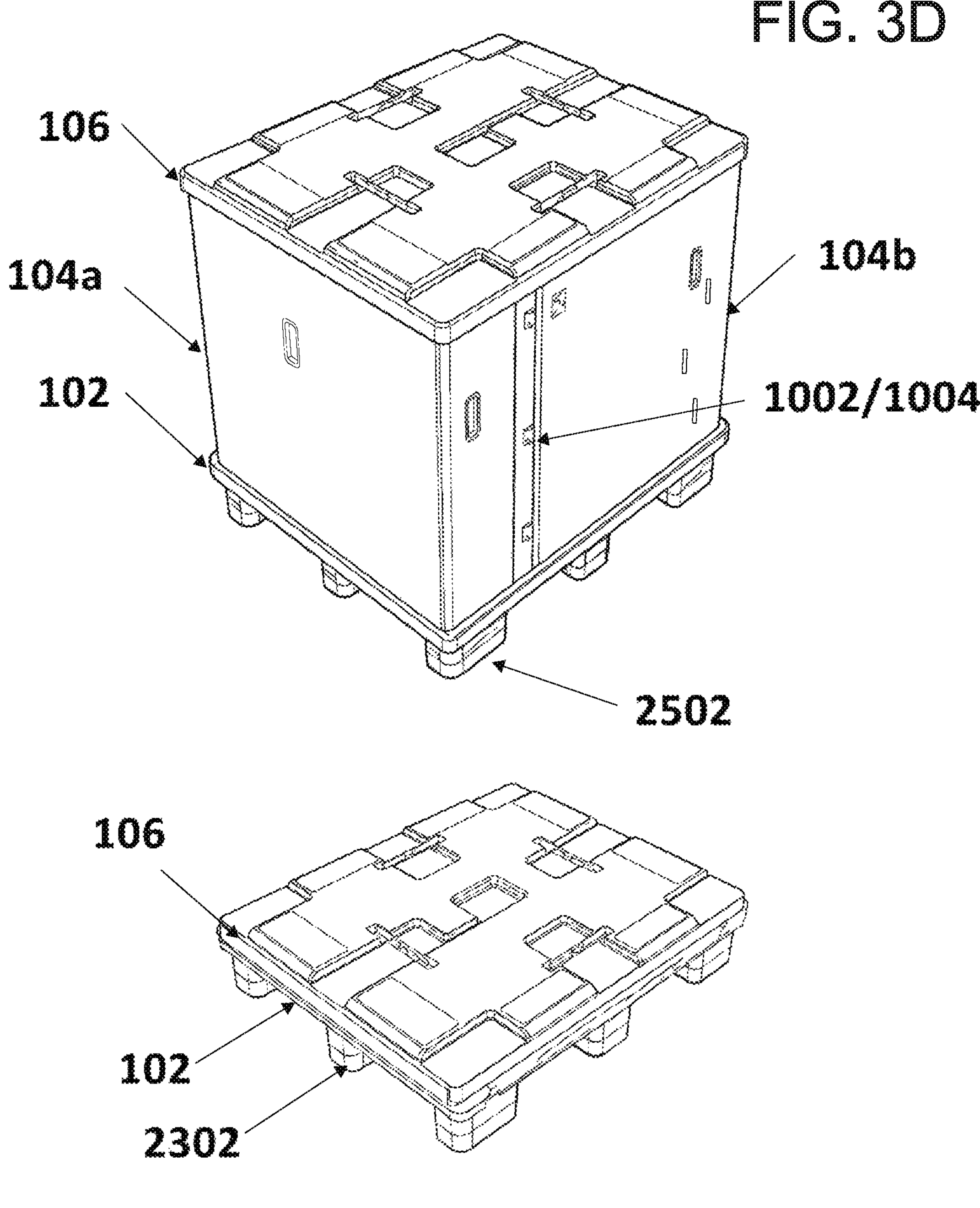
FIGS. 3*d-e* show a comparison between an exemplary transport system in a fully deployed state and an exemplary transport system in a folded state, according to some embodiments of the invention.

FIGS. 3*d* and 3*e* show a comparison between an exemplary transport system 100 in a fully deployed state (FIG. 3*d*) and an exemplary transport system 100 in a folded state (FIG. 3*e*).

In some embodiments, the components of the transport system 100 are made of recycled materials.

Exemplary Base

Figure 4A:
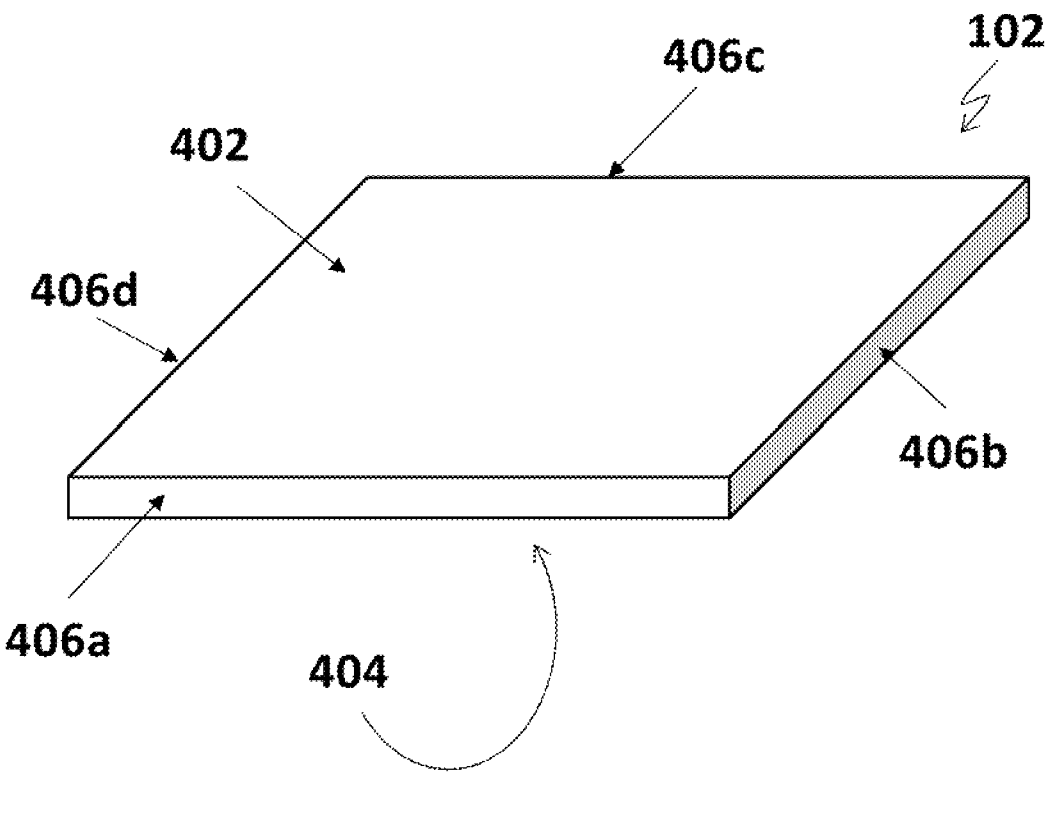
FIGS. 4*a-c* are schematic representations of an exemplary base, according to some embodiments of the invention.
Figures 4B, 4C:
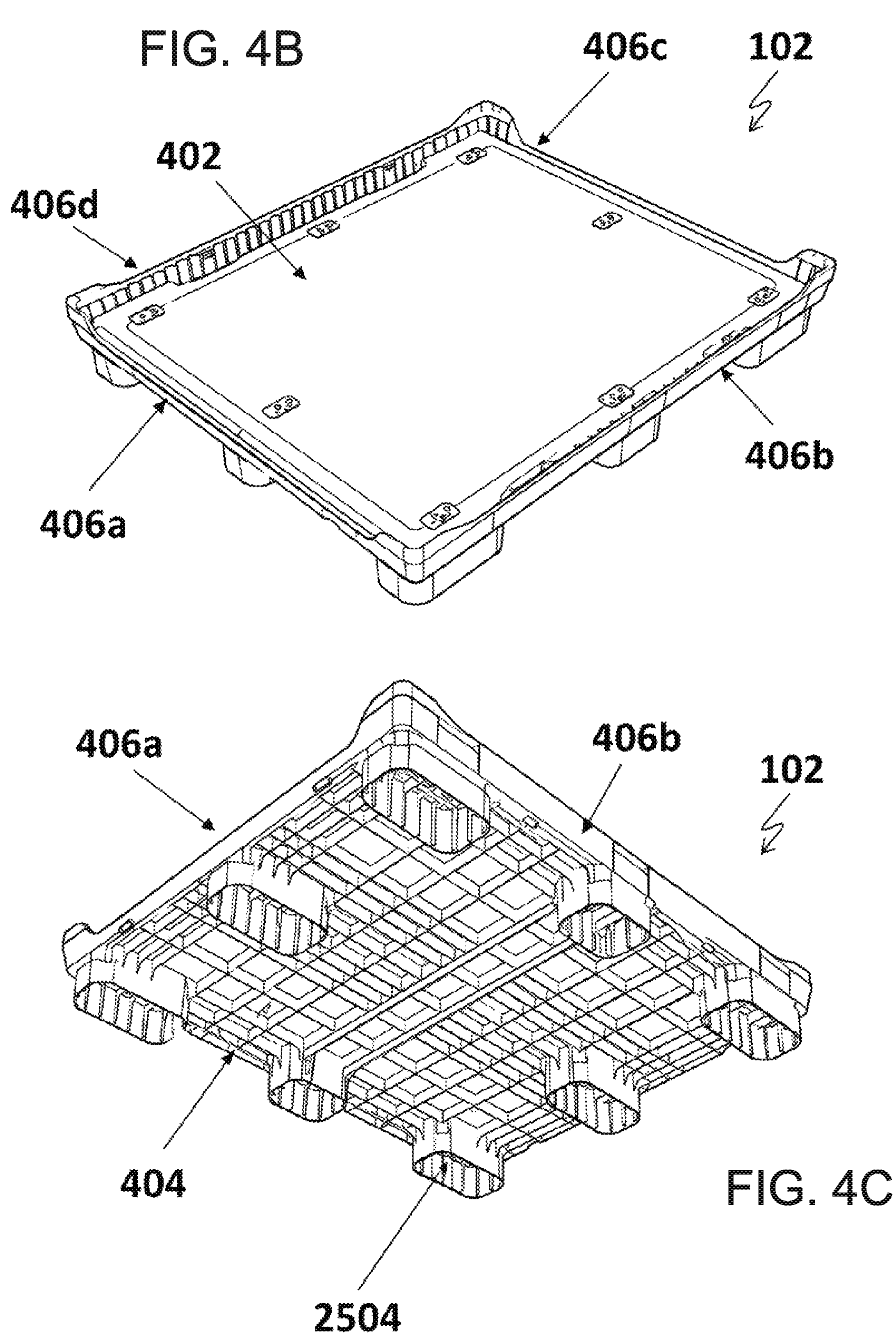

Referring now to FIGS. 4*a-c*, showing a schematic representations of a base, according to some embodiments of the invention. In some embodiments, the base 102 comprises:

1. A top surface 402, comprising the features for reversibly interconnecting the components of the system, on which products, boxes of products, and other objects are stored for storage and/or for transport.

2. A bottom surface 404, which is in contact with an external surface (for example the floor) and/or the external environment where the transport system is located (track, shelf, container, etc.). In some embodiments, the bottom surface 404 comprises features to enable use of a forklift or a hand-lift, for example protrusions, legs, extensions, spaces, etc.

3. Four side surfaces 406*a-d* defining the external periphery of the base 102.

As mentioned above, each of the components of the transport system 100 comprises features for reversibly interconnecting the components. Typically, in transport systems comprising a base and sleeves, the connection between the base and the sleeve is characterized by mainly two different techniques, retention by flaps and retention by grooves. Additionally, in some embodiments, the base comprise components that are meant to be attached to the bottom part of the base, for example, dedicated legs configured to provide a space separation between the bottom surface of the base and the floor on which the base is positioned. In some embodiments, the space generated by the bottom components is used, for example, to allow a forklift to access the transport system. In some embodiments, the components attached and/or connected to the bottom are reversibly connected components. In some embodiments, the components attached to the bottom surface of the base are connected by means of a cam, as will be further disclosed below.

Figures 5A, 5B:
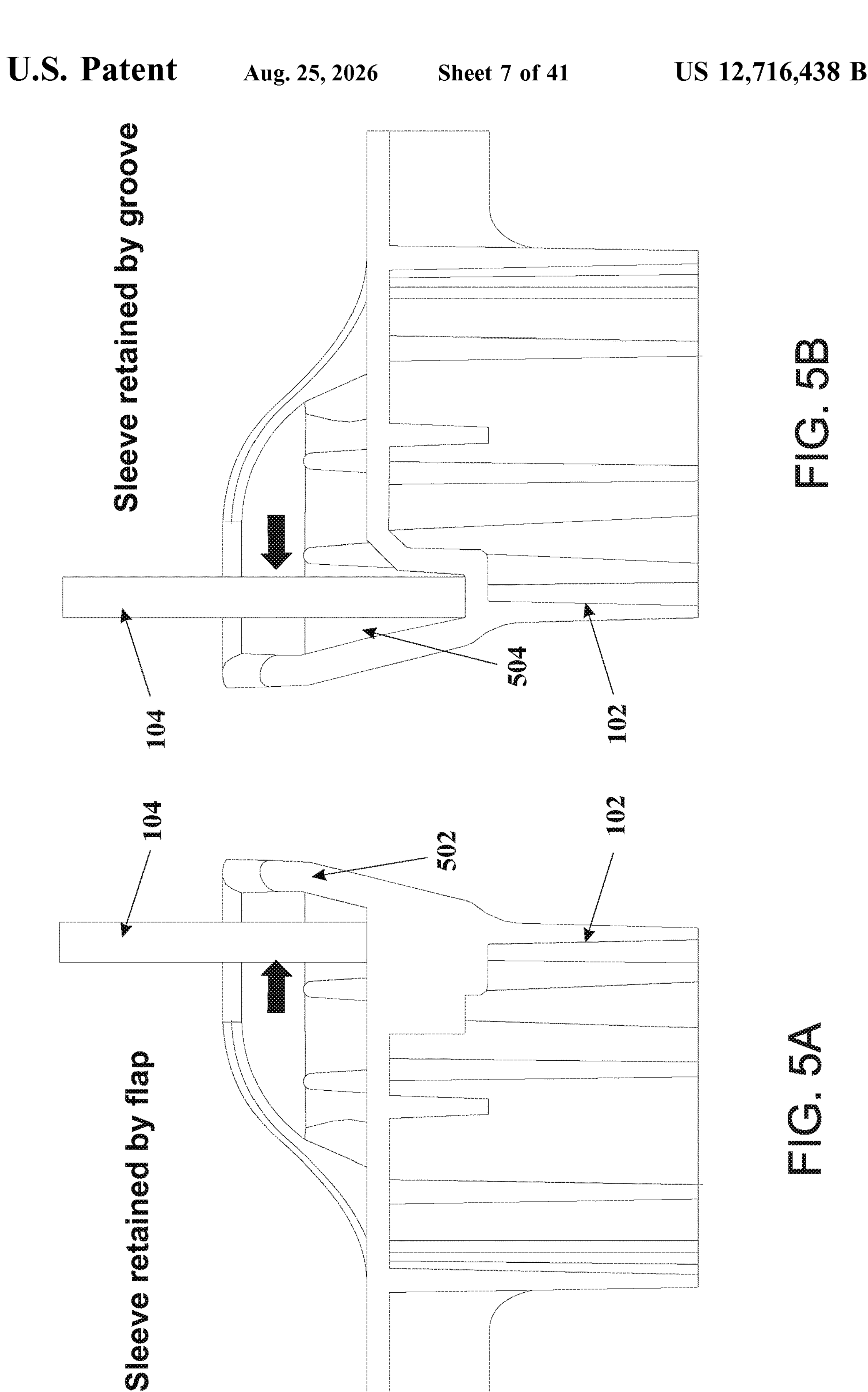
FIGS. 5*a-b* are schematic representations of two different techniques used in the connection between a base and a sleeve, according to some embodiments of the invention.

Referring now to FIGS. 5*a-b*, showing a schematic representation of two different techniques used in the connection between a base and a sleeve, according to some embodiments of the invention. FIG. 5*a* shows a schematic representation of a connection between the sleeve 104 and a base 102, where the sleeve is retained by means of flap 502. In some embodiments, the flap 502 in the base 102 holds the sleeve 104 in place. FIG. 4*b* shows a schematic representation of a connection between the sleeve 104 and a base 102, where the sleeve is retained by means of groove 504. In some embodiments, the groove 504 in the base 102 holds the sleeve 104 in place. In some embodiments, the grooves comprise an inward tapering on at least a part of the external side of the grove, as shown for example in FIG. 17. In some embodiments, a potential advantage of having an inward tapering on at least a part of the external side of the grove is that it allows the user to easily insert the extension inside the groove at an angle and then straighten the sleeve in place.

Furthermore, typically, prior art bases utilize one technique of the two mentioned above, as shown for example in FIG. 6*a*. The dotted line 602 in FIG. 6*a* shows that the chosen technique, either flap or groove, in the prior art is the same over the whole periphery of the base; also referred as perimetrically grooved or perimetrically flapped. Referring now to FIG. 6*b*, showing a schematic representation of the features of an exemplary base 102, according to some embodiments of the invention. In some embodiments, the base 102 comprises utilizes both techniques, flaps and grooves, to hold the sleeves. In some embodiments, the features of the base 102 that hold the sleeves are flaps and grooves. In FIG. 6*b*, the zones where there are grooves are shown with dashed lines 604/606. In some embodiments, exemplary grooves 604 extend along the whole front and back sides of the perimeter of the top surface of the base 102. In some embodiments, exemplary grooves 606 partially extend along the side sides of the perimeter of the top surface of the base 102, leaving "un-grooved" parts 608 along the perimeter of the top surface of the base 102. In some embodiments, the base 102 comprises flaps 502 around the whole periphery of the base 102. In some embodiments, flaps 502 are located in some places of the periphery of the base 102.

In some embodiments, exemplary grooves along the periphery of the base are not angle grooves, meaning grooves on the back side and/or on the front side do not meet grooves on neither the right side nor the left side.

In some embodiments, if and when grooves from the back side and/or the front side meet grooves from the right side and/or the left side, thereby generating an angle groove in the corner of the base, the angle in the base comprises a gap on the internal surface of the base thereby cancelling the groove at the angle of the base and generating a hole on the surface of the base. In some embodiments, a potential advantage of cancelling the angle groove in the corner of the base by providing a gap in the corner is that it facilitates the insertion of the extension of the sleeves into the grooves by eliminating the need to coordinate the sleeves into the grooves at the angles.

Figures 7A, 7B:
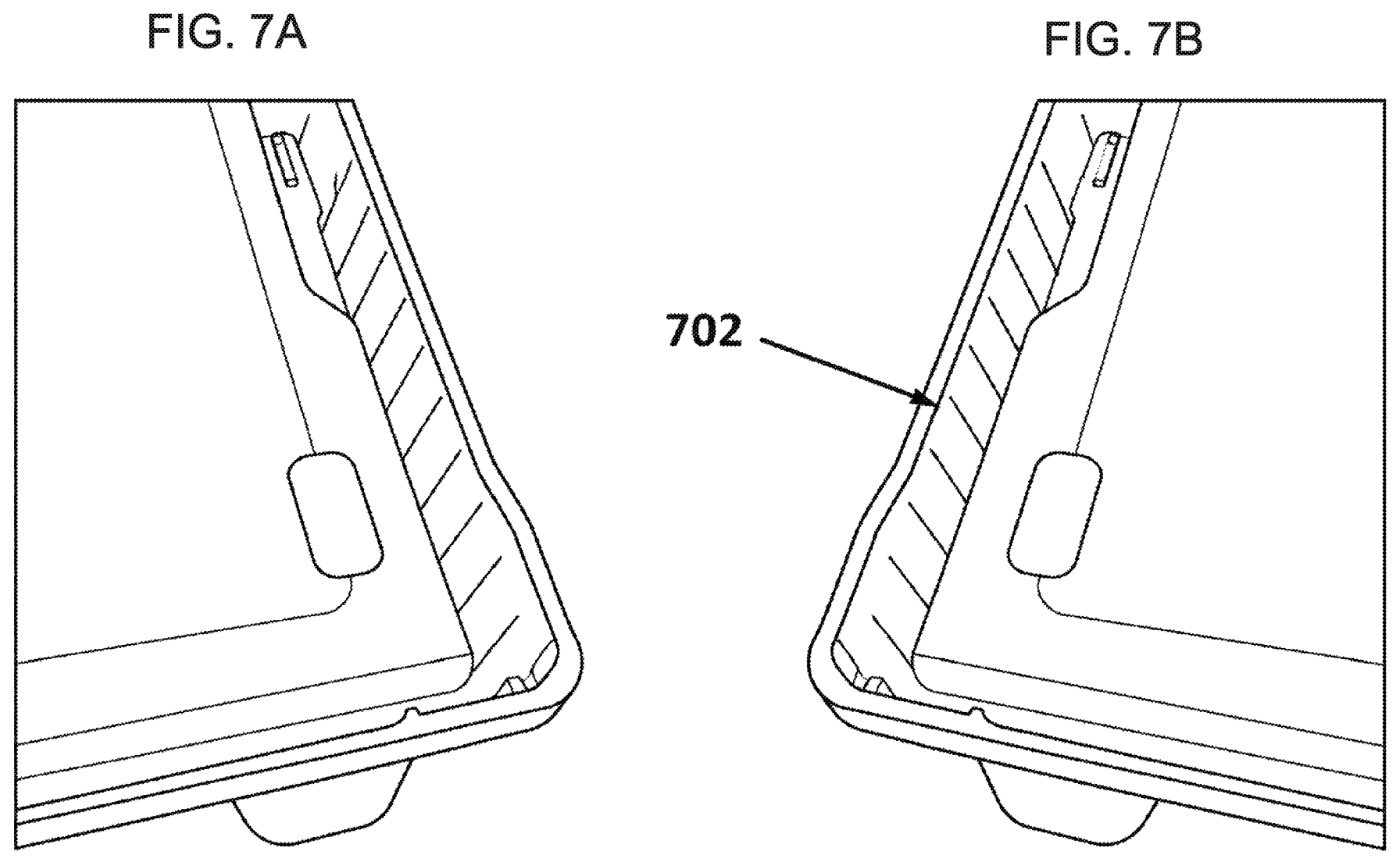

Referring now to FIGS. 7*a-b*, showing a perspective view for comparison of a prior art base with a base of the invention, according to some embodiments of the invention. FIG. 7*a* shows a perimetrically grooved prior art base, while FIG. 7*b* shows a non-perimetrically grooved base. Arrow 702 points to a zone of the base that do not comprises a groove.

Referring now to FIGS. 8*a-b*, showing sizes of exemplary bases, according to some embodiments of the invention. In some embodiments, base 102 comprises one or more sides having a length of from about 40" (inch) to about 50". Optionally from about 35" to about 55". Optionally from about 30" to about 60". In some embodiments, base 102 comprises another one or more sides having a length of from about 35" (inch) to about 45". Optionally from about 25" to about 55". Optionally from about 20" to about 60". In some embodiments, the base comprises measures as shown for example in FIGS. 8*a-b*. It should be understood that these measures are exemplary measures only, provided to allow a person having skills in the art to reproduce the invention. Other measures could be used and should be understood that those are also meant to be included in scope of the invention. In some embodiments, the base comprises an elastic modulus higher than 600 MPa, optionally from about 500 MPa to about 1000 MPa, optionally from about 400 MPa to about 2500 MPa, optionally from about 600 MPa to about 5000 MPa. In some embodiments, the base comprises an IZOD higher than 12 Kj/sqm, optionally from about 10 Kj/sqm to about 30 Kj/sqm, optionally from about 10 Kj/sqm to about 100 Kj/sqm, optionally from about 10 Kj/sqm to about 1000 Kj/sqm. In some embodiments, the base is made of PE having an average thickness of about 0.3".

Exemplary Cover

Referring now to FIGS. 9*a-c*, showing schematic representations of exemplary covers, according to some embodiments of the invention. In some embodiments, the cover 106 comprises:

1. A top surface 902, comprising indentations for receiving extension legs or bottom legs from another transport system when one is mounted on top of another.
2. A bottom surface 904.
3. Four side surfaces 906*a-d* defining the external periphery of the cover 106.

Figures 24A, 24B:
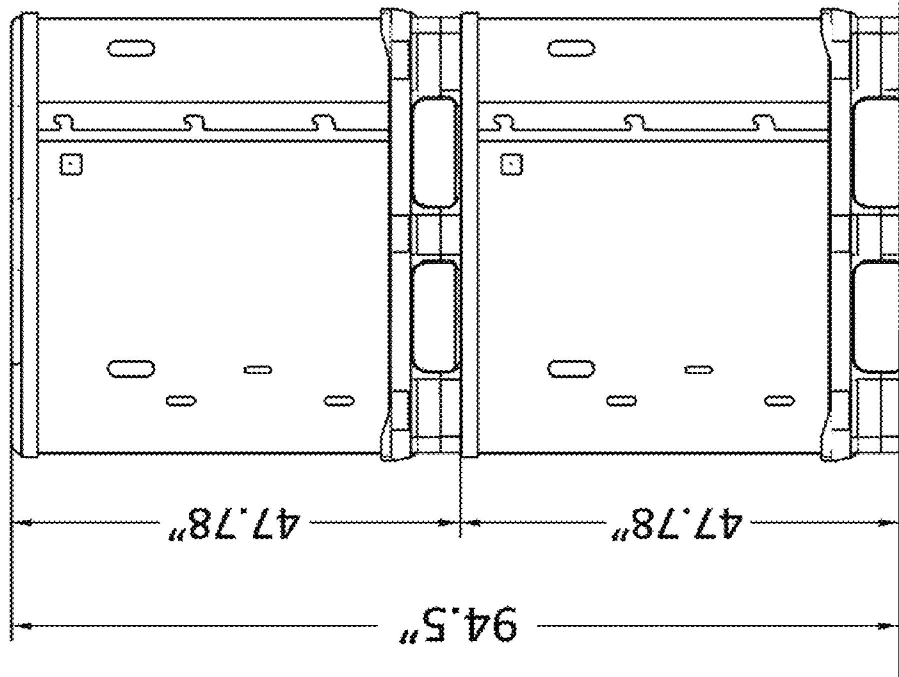
FIGS. 24*a-b* are schematic illustrations of an exemplary transport system stacked, according to some embodiments of the invention.

In some embodiments, the top surface 902 of the cover 106 comprises indentations 908*a-i* configured to receive bottom legs of another transport system when two or more transport systems are mounted on top of another (See FIGS. 24*a* and 24*b*).

In some embodiments, the cover comprises measurements as shown for example in FIG. 9*c*. It should be understood that these measures are exemplary measures only, provided to allow a person having skills in the art to reproduce the invention. Other measures could be used and should be understood that those are also meant to be included in scope of the invention. In some embodiments, the cover comprises an elastic modulus higher than 600 MPa, optionally from about 500 MPa to about 1000 MPa, optionally from about 400 MPa to about 2500 MPa, optionally from about 600 MPa to about 5000 MPa. In some embodiments, the cover comprises an IZOD higher than 12 Kj/sqm, optionally from about 10 Kj/sqm to about 30 Kj/sqm, optionally from about 10 Kj/sqm to about 100 Kj/sqm, optionally from about 10 Kj/sqm to about 1000 Kj/sqm. In some embodiments, the cover is made of PE having an average thickness of about 0.22".

Exemplary Sleeves

Figure 10:
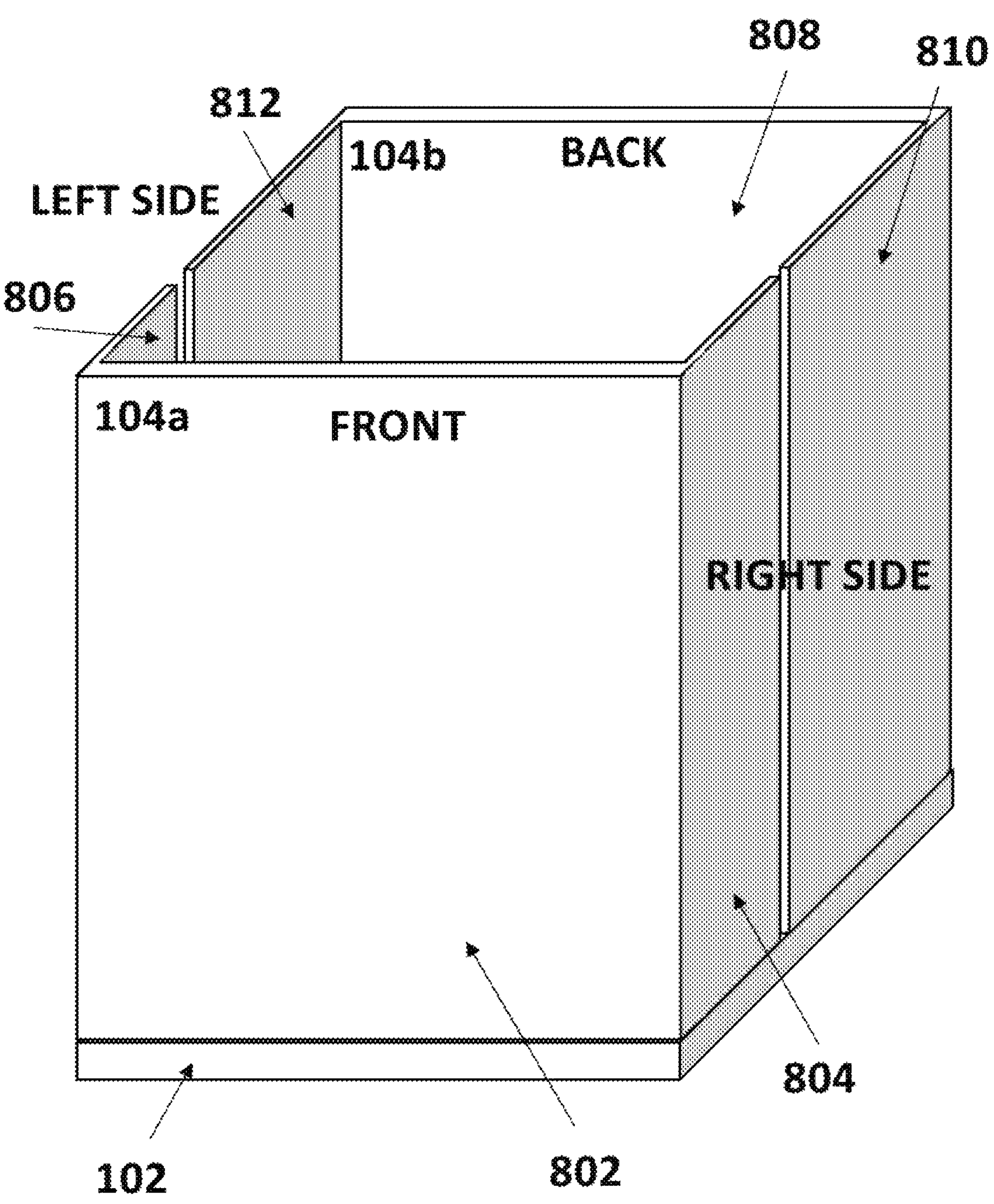
FIG. 10 is a schematic representation of exemplary sleeves with a base, according to some embodiments of the invention.

In some embodiments, one or more sleeves are used in the transport system. In some embodiments, two or more sleeves are used in the transport system. In some embodiments, when more than one sleeve is used, the sleeves are identical. In some embodiments, when more than one sleeve is used, the sleeves are different from each other. Referring now to FIG. 10, schematically showing exemplary sleeves with a base, according to some embodiments of the invention. In a preferred embodiment, two sleeves (104*a-b*) are used in the transport system 100. In some embodiments, the transport system 100 is arranged so there is a front sleeve 104*a* and a back sleeve 104*b*. In some embodiments, front sleeve 104*a* comprises a front surface 802, a front right side surface 804 and a front left side surface 806 (also referred as front C-shape sleeve). In some embodiments, back sleeve 104*b* comprises a back surface 808, a back right side surface 810 and a back left side surface 812 (also referred as back C-shape sleeve). In some embodiments, front surface 802 and back surface 808 extend along the entire length of the base 102, on the front side and on the back side, respectively. In some embodiments, front right side surface 804, front left side surface 806, back right side surface 810 and back left side surface 812 each partially extend along the right side and left side respectively of the periphery of the base 102.

In some embodiments, front right side surface 804 and back right side surface 810 are configured to cover the entire perimeter of the right side of the base 102. In some embodiments, front right side surface 804 and back right side surface 810 comprise an overlapping area where the two meet. In some embodiments, the side of front right side surface 804 and the side of the back right side surface 810 both comprise a feature that complement each other to perform a reversible interconnection between front right side surface 804 and back right side surface 810 where the two meet (see below exemplary reversible holder and FIGS. 13*a-b*).

Similarly to the abovementioned, in some embodiments, front left side surface 806 and back left side surface 812 are configured to cover the entire perimeter of the right side of the base 102. In some embodiments, front left side surface 806 and back left side surface 812 comprise an overlapping area where the two meet. In some embodiments, the side of front left side surface 806 and the side of the back left side surface 812 both comprise a feature that complement each other to perform a reversible interconnection between front left side surface 806 and back left side surface 812 where the two meet (see below exemplary reversible holder and FIGS. 13*a-b*).

In some embodiments, front right side surface 804, front left side surface 806, back right side surface 810 and back left side surface 812 are configured to fold on front surface 802 and back surface 808, respectively.

Figure 11:
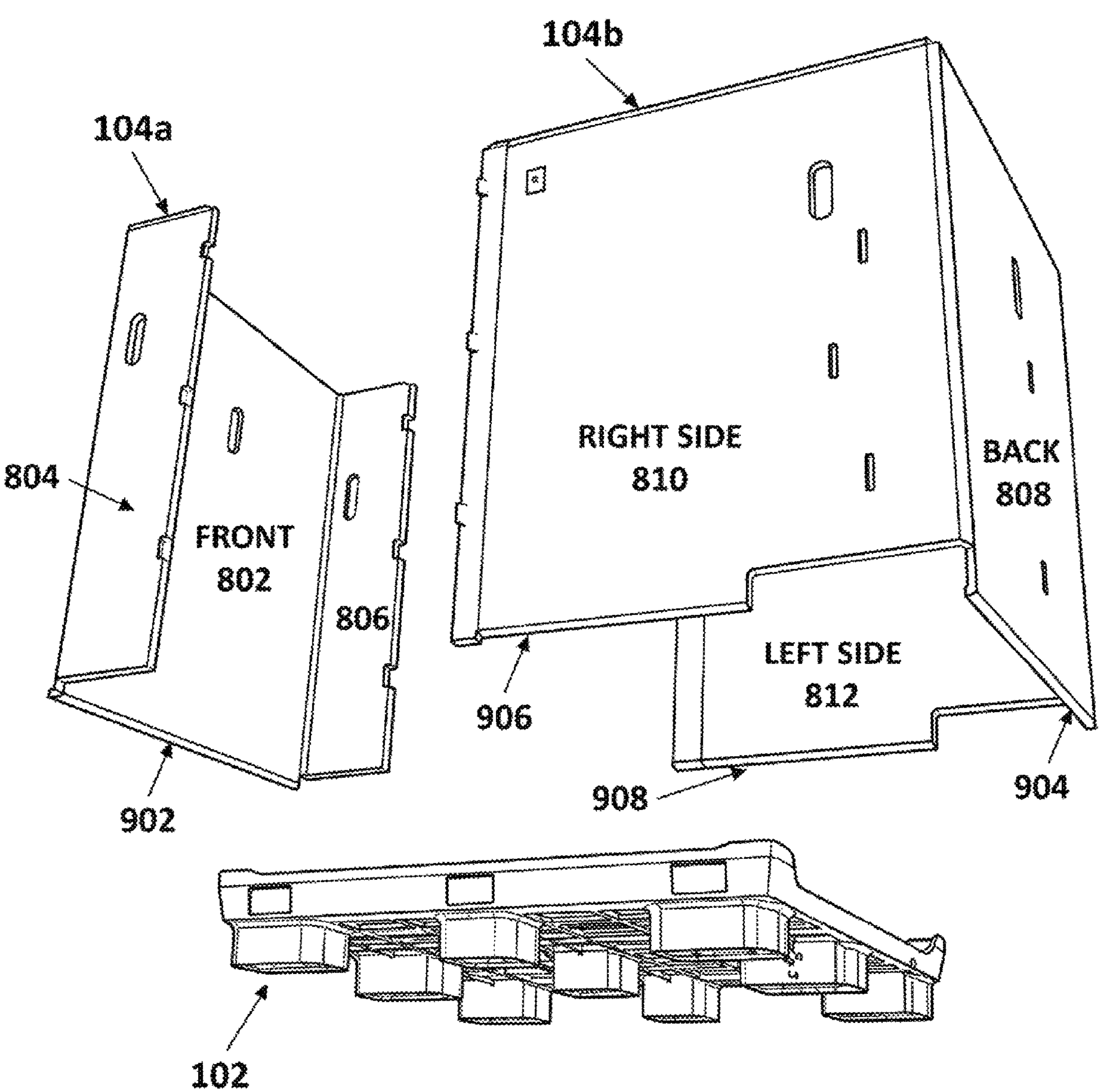
FIG. 11 is a schematic representation of exemplary features for reversibly interconnecting the components of the transport system, according to some embodiments of the invention.

In some embodiments, back right side surface 810 and back left side surface 812 are wider than front right side surface 804 and front left side surface 806, as shown for example in FIGS. 10 and 11.

In some embodiments, whether one sleeve is used or a plurality of sleeves are used or some surfaces are wider than others, the sleeve(s) cover the whole perimeter of the base, thereby enclosing the area above the surface of the base.

Referring now to FIG. 11, showing exemplary features for reversibly interconnecting the components of the transport system 100, according to some embodiments of the invention. In some embodiments, the sleeves comprise one or more extensions of the surfaces. In some embodiments, the one or more extensions extend along the whole surface. In some embodiments, the one or more extensions extend partially along the surfaces.

In some embodiments, front sleeve 104*a* comprises 3 surfaces, front surface 802, front right side surface 804 and front left side surface 806. It can be seen that front surface 802 comprises an extension 902, while front right side surface 804 and front left side surface 806 do not. Furthermore, it can be seen in this example that the extension 902 extends along the whole surface of the bottom part of the front surface 802. In some embodiments, extension 902 of the front surface 802 enters and/or is inserted, for example, into groove 604 (seen in base 102 in FIG. 6*b*), while front right side surface 804 and front left side surface 806 that do not comprise extensions lay on top of un-grooved sections 608 and are optionally held in place by flaps 502.

In some embodiments, back sleeve 104*b* comprises 3 surfaces, a back surface 808, a back right side surface 810 and a back left side surface 812. It can be seen that back surface 808 comprises an extension 904, while back right side surface 810 and back left side surface 812 each comprise an extension 906/908 that partially'extends along bottom part of the respective surfaces. Furthermore, it can be seen in this example that the extension 904 extends along the whole surface of the bottom part of the back surface 808. In some embodiments, extension 904 of the back surface 808 enters and/or is inserted, for example, into groove 604 (seen in base 102 in FIG. 6*b*), while the extensions in the back right side surface 810 and a back left side surface 812 enter and/or are inserted, for example, into grooves 606 (seen in base 102 in FIG. 6*b*), and the parts not comprising extensions lay on top of un-grooved sections 608 and are optionally held in place by flaps 502.

In some embodiments, base and sleeves are manufactured so as to match between grooves and extensions. In some embodiments, there are one or more extensions and one or more of matching grooves.

Figure 12:
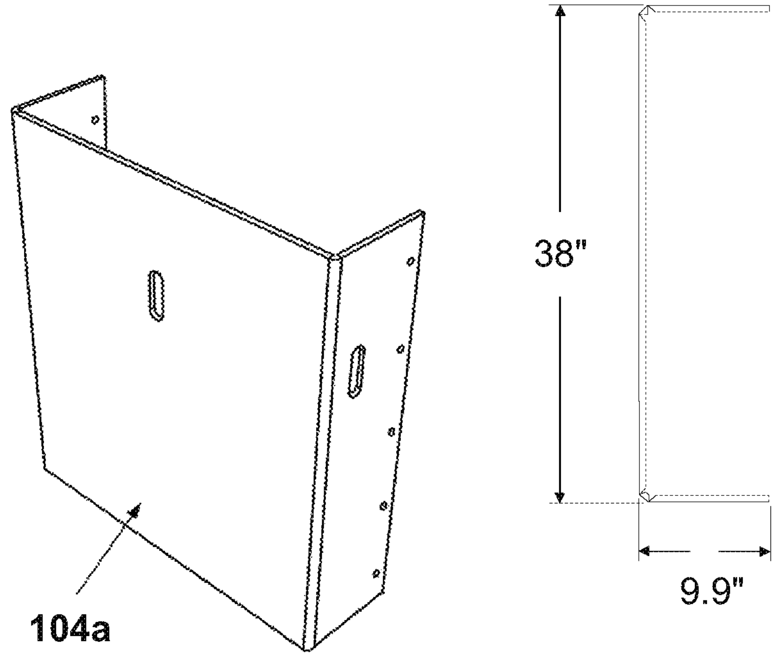
FIG. 12 is a schematic representation of exemplary measurements of an exemplary sleeve, according to some embodiments of the invention.

In some embodiments, the sleeves comprise measurements as shown for example in FIG. 12. It should be understood that these measures are exemplary measures only, provided to allow a person having skills in the art to reproduce the invention. Other measures could be used and should be understood that those are also meant to be included in scope of the invention. In some embodiments, the cover is made of Polypropylene panel having an average thickness of from about 0.39" to about 0.43"; and a density of about equal or higher than 3000 gr/sm.

Exemplary Reversible Holder

Figures 13A, 13B:
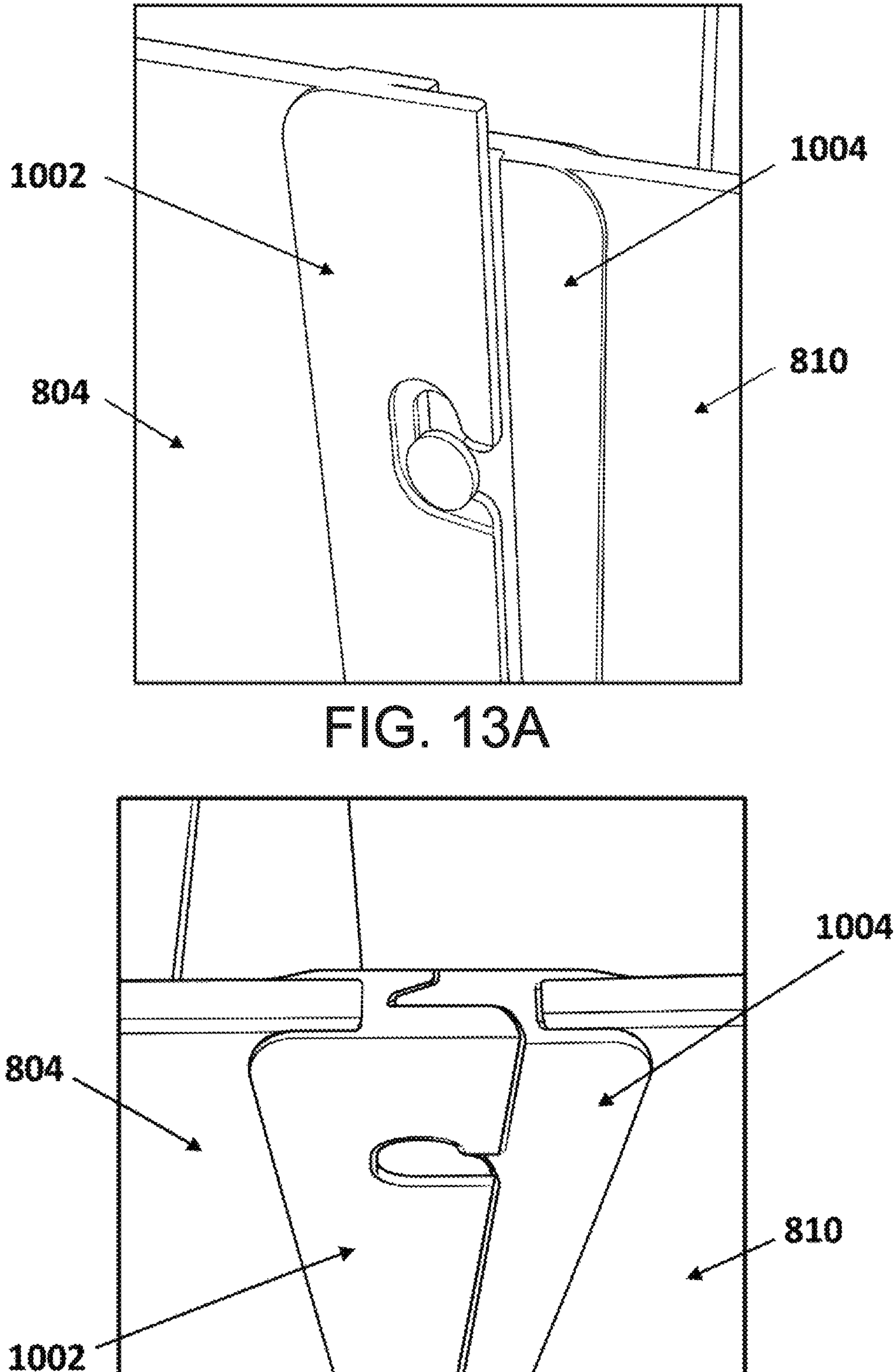
FIGS. 13*a-b* are schematic representations of exemplary holders, according to some embodiments of the invention.

In some embodiments, front sleeve 104*a* and back sleeve 104*b* each comprise an element that are complementary to each other. In some embodiments, when the two elements are interconnected, they reversibly hold the two sleeves together. Referring now to FIGS. 13*a-b*, showing schematic representations of exemplary holders, according to some embodiments of the invention. In some embodiments, along the vertical ends of the front right side surface 804 and the front left side surface 806 there are first sides of the exemplary reversible holder 1002. In some embodiments, along the vertical ends of back right side surface 810 and back left side surface 812 there are second sides of the exemplary reversible holder 1004. In some embodiments, the reversible holders 1002/1004 extend along the whole vertical end of the sleeves. A potential advantage of extending along the whole vertical end of the sleeves is that it potentially ensures that the sleeves will stay attached during transport and that the contents of the transport system will not exit the system during transport. In some embodiments, the reversible holders 1002/1004 only extend partially along the vertical end of the sleeves and/or are located in several places along the vertical end of the sleeves. In some embodiments, the mechanism of the exemplary reversible holder is as shown in FIGS. 13*a-b*, which is male-female interlocking structure where the female structure comprises an "L" shape where the male structure slides therein. The inventors have found that this locking mechanism is very effective and easy to operate in comparison to other mechanisms, as will be further explained below in the methods section. In some embodiments, the reversible holding mechanism is other than the one disclosed in FIGS. 13*a-b*. In some embodiments, the reversible holding mechanism is one or more of Velcro, snaps and mechanical elements.

In some embodiments, the reversible holding mechanism comprises an elastic modulus of about 1800 MPa, optionally from about 1500 MPa to about 2000 MPa, optionally from about 1000 MPa to about 3000 MPa, optionally from about 2000 MPa to about 5000 MPa. In some embodiments, the reversible holding mechanism comprises an IZOD of about 180 Kj/sqm, optionally from about 100 Kj/sqm to about 250 Kj/sqm, optionally from about 150 Kj/sqm to about 500 Kj/sqm, optionally from about 180 Kj/sqm to about 1000 Kj/sqm. In some embodiments, the reversible holding mechanism is made of PE having an average thickness of about 0.11".

Exemplary Methods

Referring now to FIG. 14, showing a schematic flowchart of an exemplary method of mounting the transport system, according to some embodiments of the invention. In some embodiments, the transport system is mounted as following:

1. The user places the base on a surface, for example a floor (1102).

Figure 15:
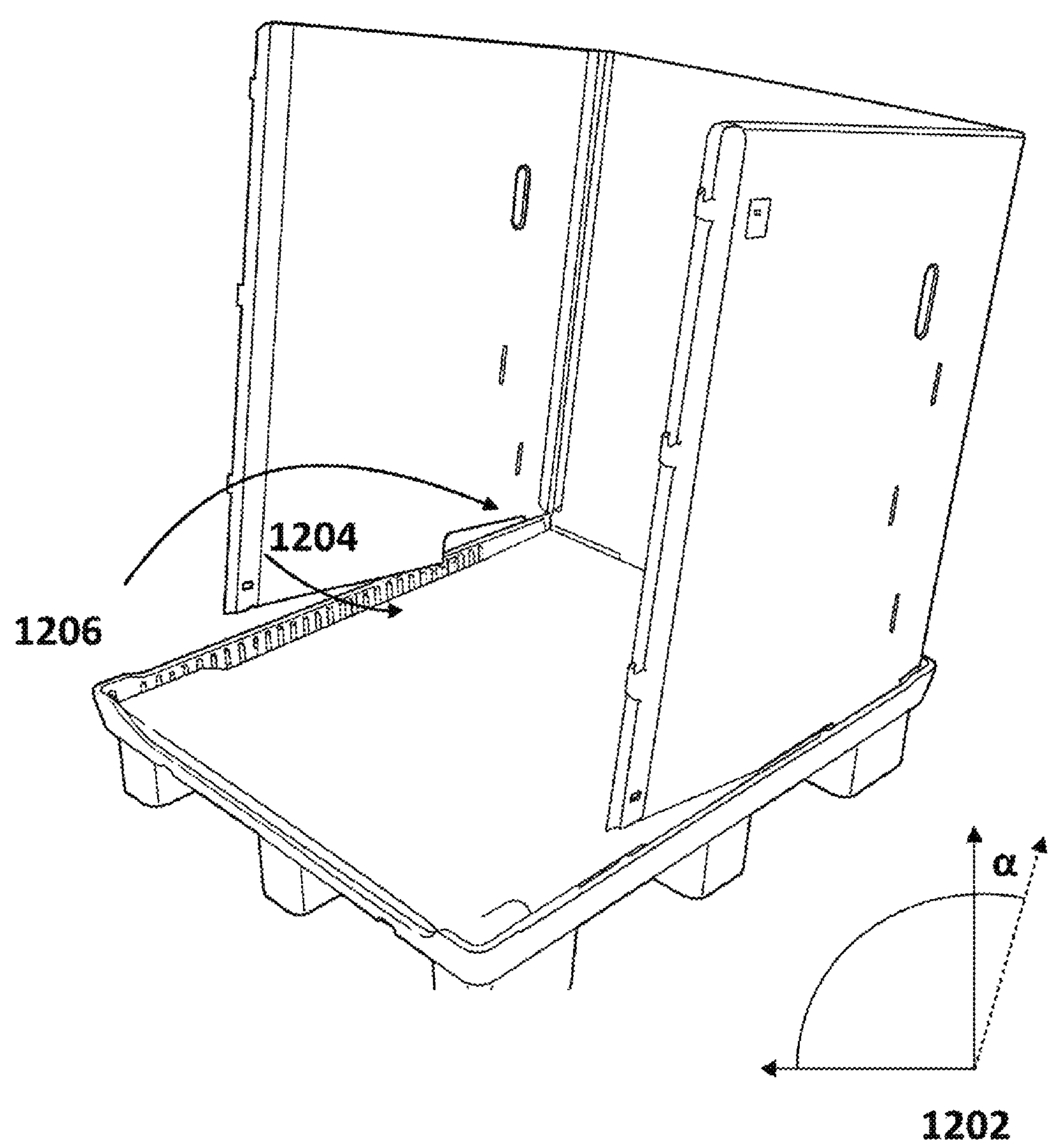
FIG. 15 is a schematic illustration of an exemplary part of the exemplary method of mounting the transport system, according to some embodiments of the invention.

2. The user places the extension 904 of the back surface 808 of the back sleeve 104*b* in the groove 604 of the base 102 (1104), optionally while holding the back sleeve 104*b* in an angle (denoted a) 1202 as shown for example in FIG. 15. A potential advantage of holding the back sleeve 104*b* at an angle is that it allows an easy insertion of the sleeve in place without applying unnecessary forces and/or pressure on the sleeve, for example in location 1206 shown in FIG. 15, when inserting 1204 the side extensions in the side grooves. In some embodiments, the grooves comprise an inward tapering on at least a part of the external side of the grove, as shown for example in FIG. 16. In some embodiments, a potential advantage of having an inward tapering on at least a part of the external side of the grove is that it allows the user to easily insert the extension inside the groove at an angle as explained above. In some embodiments, taking out the sleeve is done the same way, first the user moves the sleeve backwards to provide an angle to the sleeve in relation to the base, and then the user takes out the sleeve from the base, as will be further disclosed below.

Figure 19:
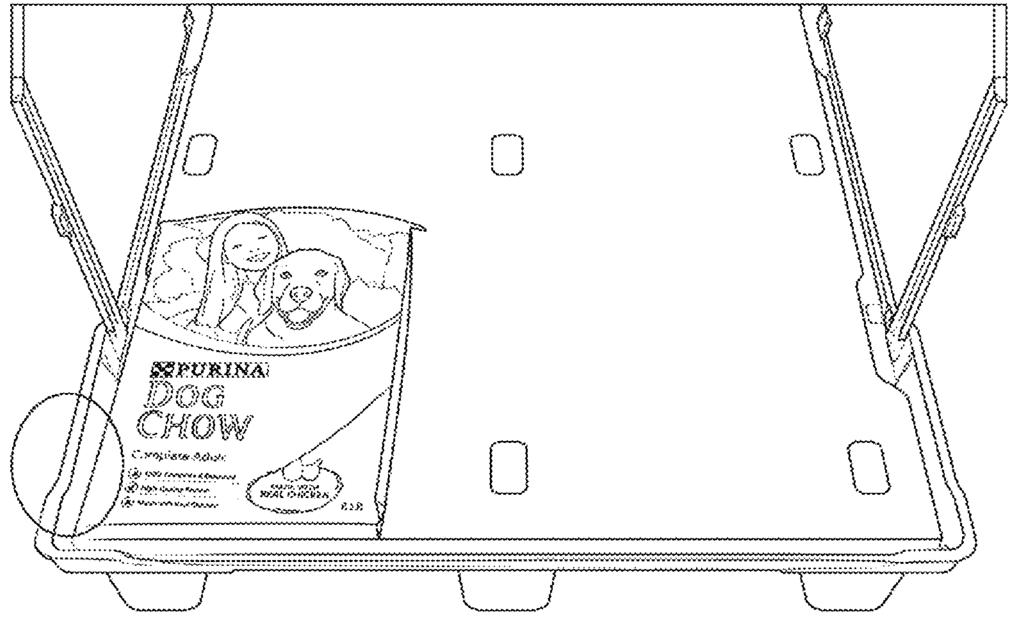
FIG. 19 is a picture of an exemplary transport system left for storing purposes, according to some embodiments of the invention.

3. The user inserts extensions 906/908 of back right side surface 810 and back left side surface 812 into grooves 606 of the base 102 (1106). In some embodiments, at this point, the system looks like in FIGS. 2*a* and 2*b*. In some embodiments, the system can be left at this point for storing purposes, as shown for example in FIG. 19.

Figure 16:
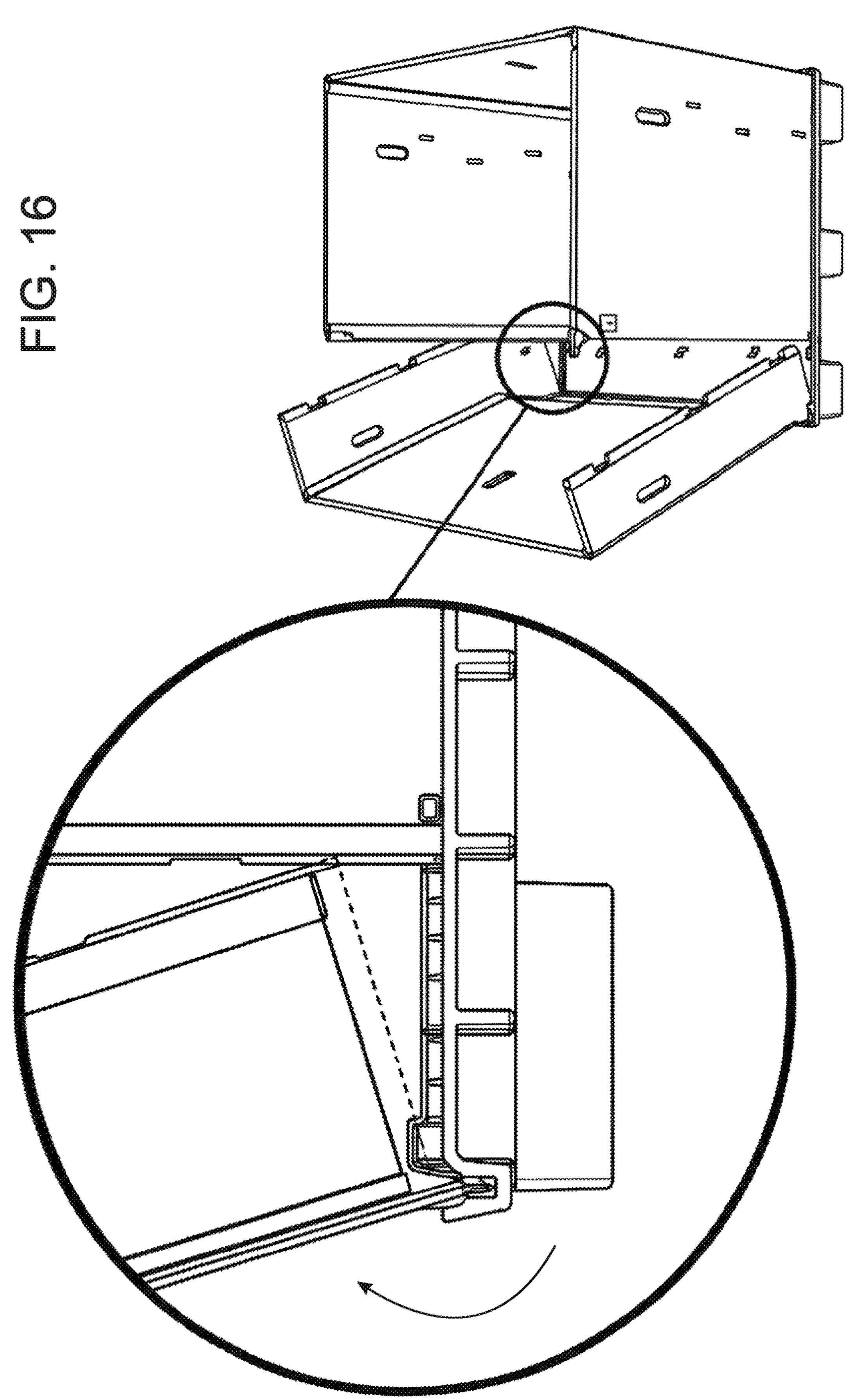
FIG. 16 is a schematic illustration of another exemplary part of the exemplary method of mounting the transport system, according to some embodiments of the invention.
Figure 17:
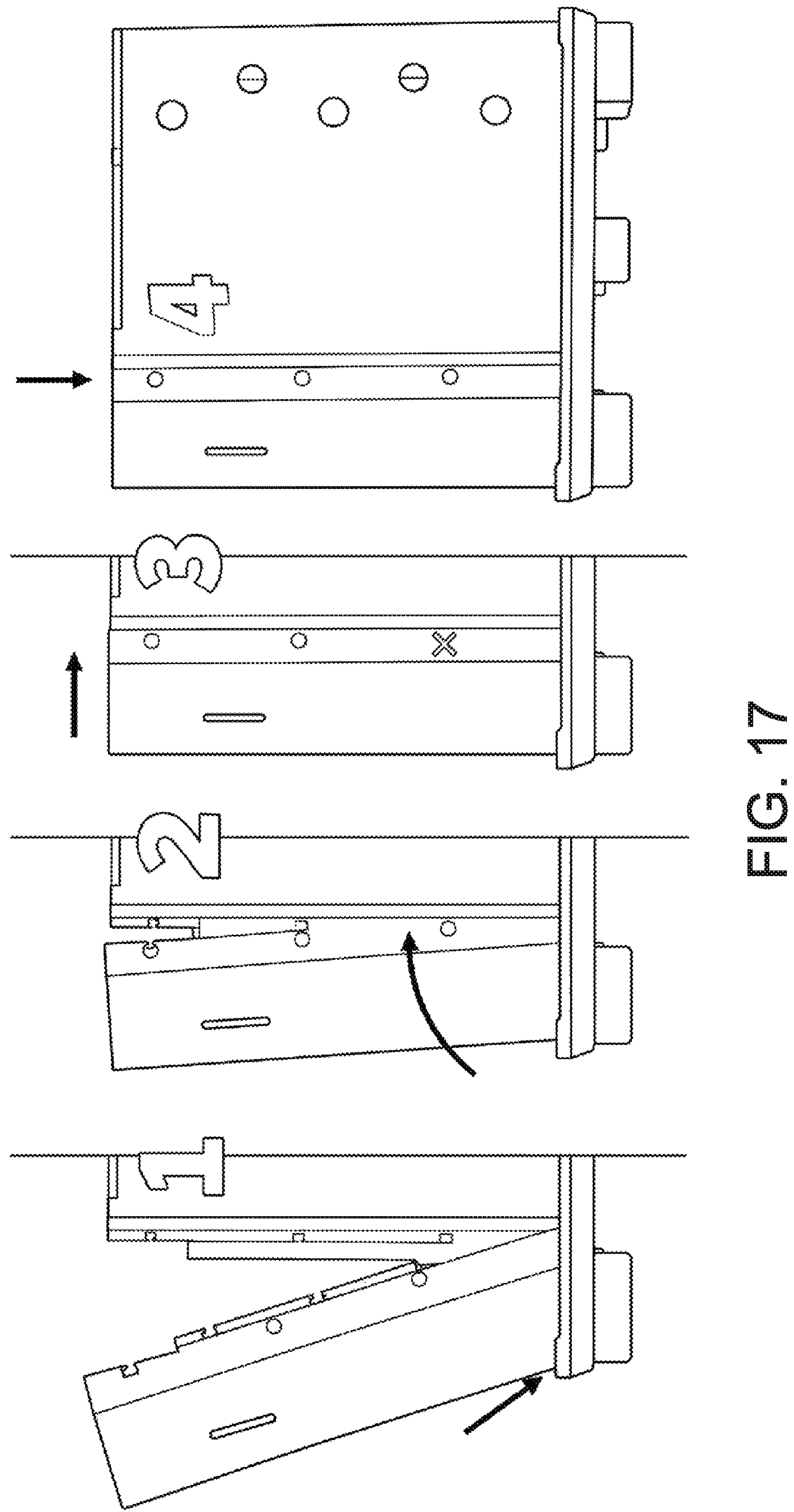
FIG. 17 is a schematic illustration of a plurality of exemplary parts of the exemplary method of mounting the transport system, according to some embodiments of the invention.

4. The user places the extension 902 of the front surface 802 of the front sleeve 104*a* in the only free groove 604 left of the base 102 (1108), optionally while holding the front sleeve 104*a* in an angle as shown in FIGS. 16 and 17. A potential advantage of holding the front sleeve 104*a* at an angle is that it allows an easy insertion of the sleeve in place without applying unnecessary forces and/or pressure on the sleeve. In some embodiments, taking out the sleeve is done the same way, first the user moves the sleeve backwards to provide an angle to the sleeve in relation to the base, and then the user takes out the sleeve from the base, as will be further disclosed below.

5. The user straights the front sleeve so front right side surface 804 and front left side surface 806 rest on the surface of the base 102 (1110), while inserting the male parts of the reversible holding mechanism located in the back sleeve into the female parts of the reversible holding mechanism located in the front sleeve, as shown for example in FIGS. 13*a* and 17.

6. The user pushes down the front sleeve 104*a* to interlock between the parts of the reversible holding mechanism (1112).

Figure 18:
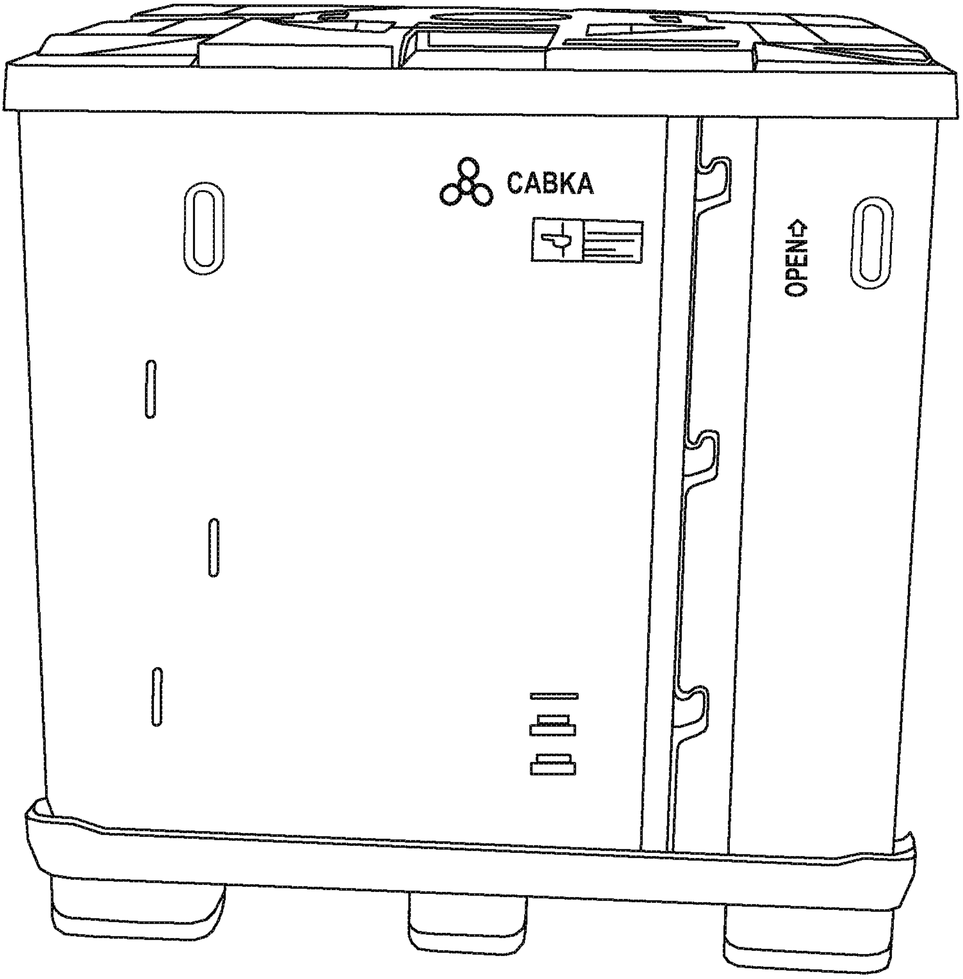
FIG. 18 is a picture of an exemplary transport system at the end of the exemplary method of mounting, according to some embodiments of the invention.

7. The user mounts the cover (1114), as shown for example in FIGS. 1*b*, 3*d* and 18.

FIG. 17 shows exemplary step by step images of the actions performed to mount the front sleeve, according to some embodiments of the invention.

Exemplary Optional Features

Figure 20:
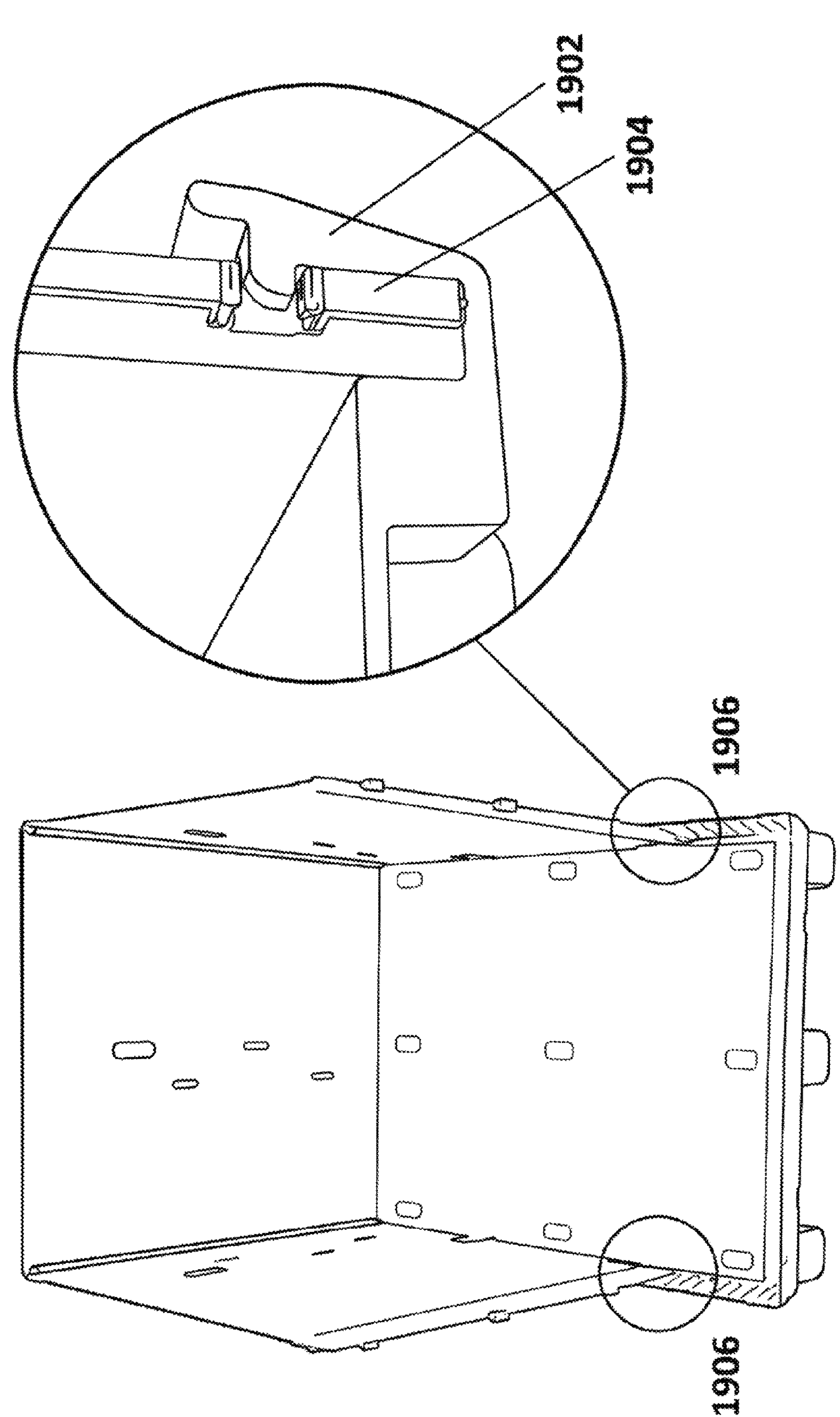
FIG. 20 is a schematic illustration of exemplary optional holder between the base and the sleeve, according to some embodiments of the invention.

In some embodiments, the system comprises an optional holder between the base 102 and the sleeve, as shown for example in FIG. 20. In some embodiments, the optional holder 1902 snaps-in in an orifice 1904 located in the sleeve. In some embodiments, one or more optional holders are added to the system. In FIG. 20, there optional holders in two locations 1906.

In some embodiments, the back sleeve comprises one or more optional clips 2002, as shown for example in FIGS.

Figure 21A:
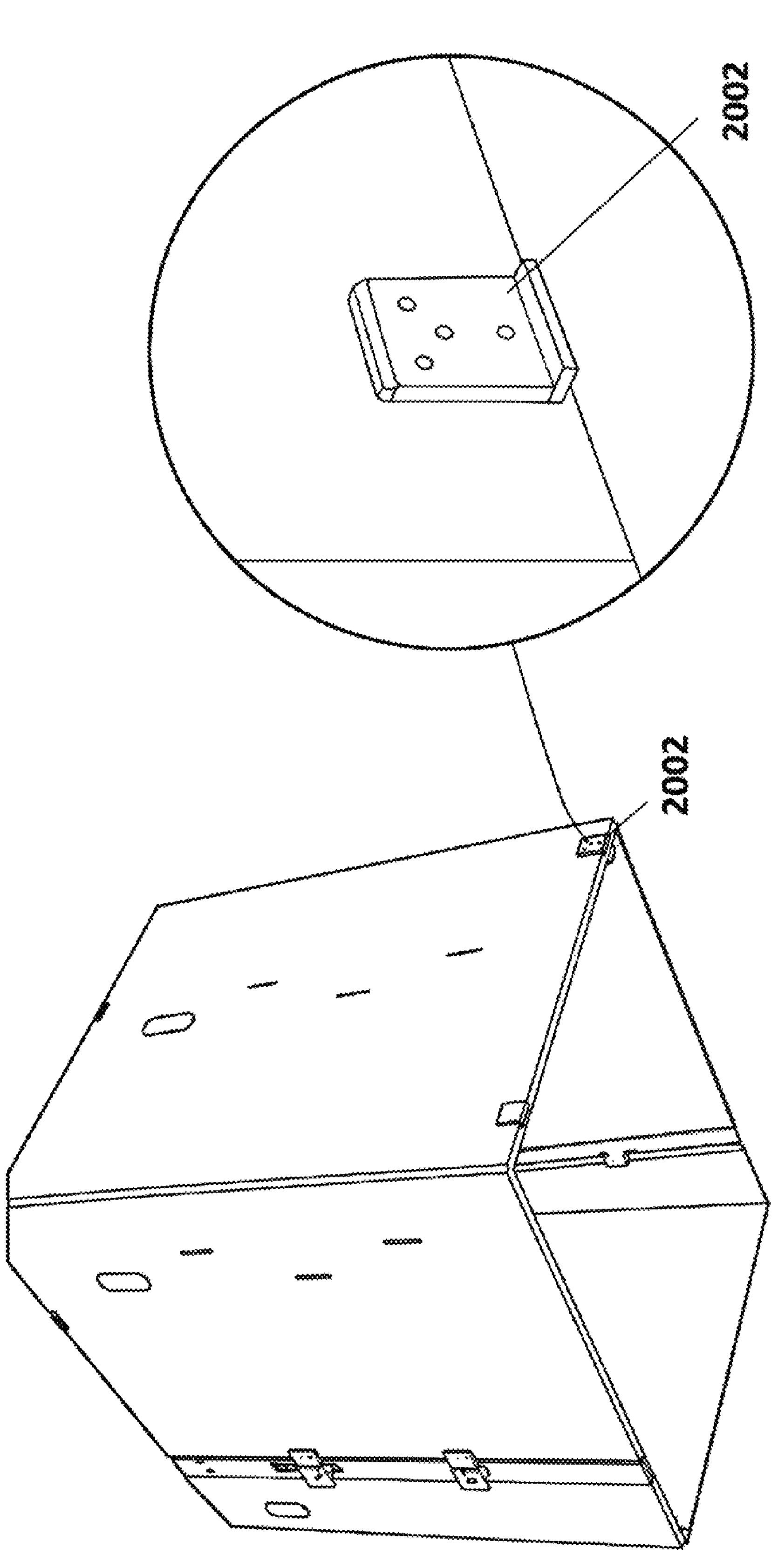
Figures 21B, 21C:
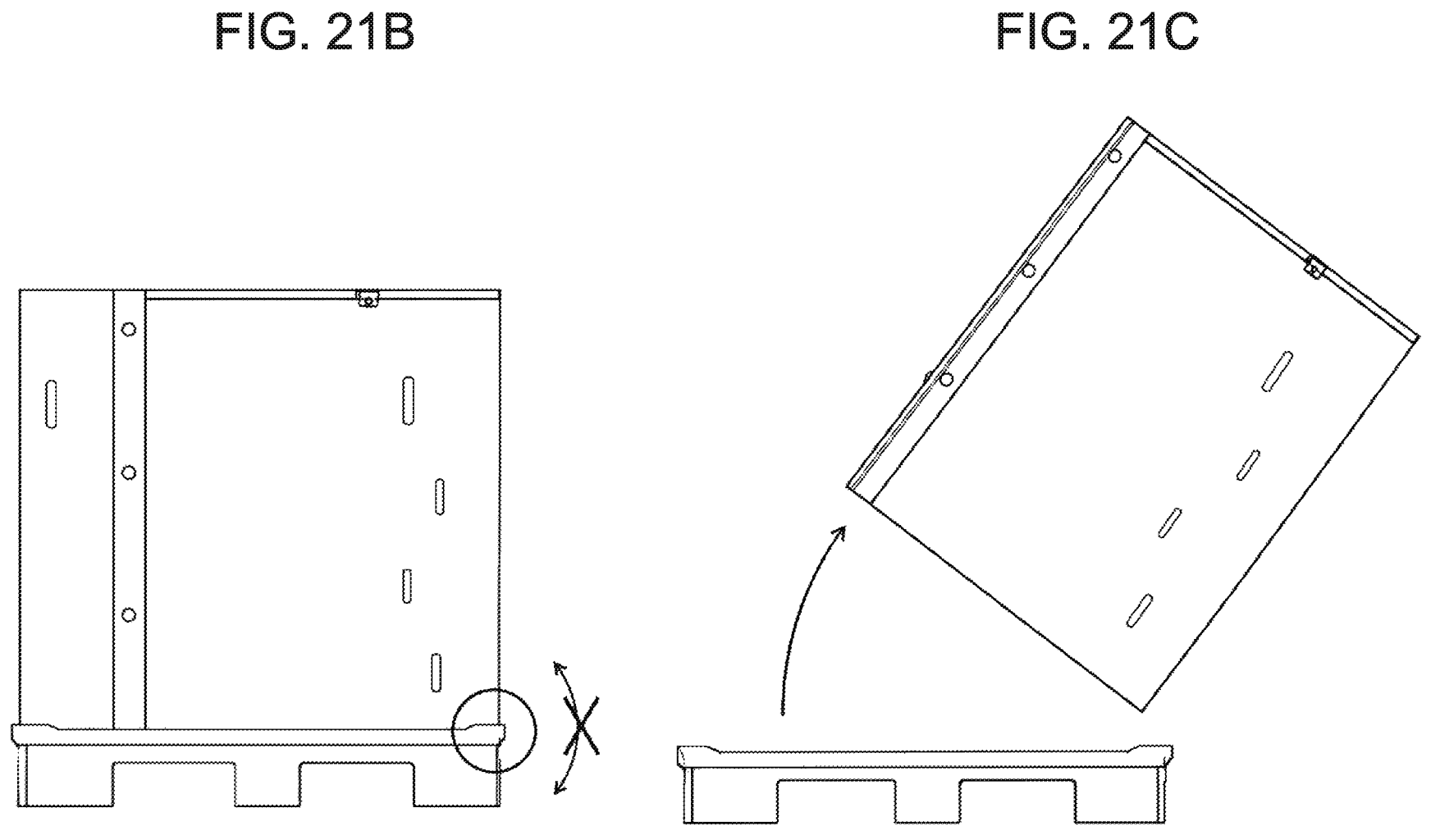

21*a-c*, adapted to engage the base and perform two actions: a. further secure the sleeve to the base, as schematically shown for example in FIG. 21*b*, and provide easy releasing of the sleeve from the base, as schematically shown for example in FIG. 21*c*. In some embodiments, to assemble and disassemble a sleeve pack, there are two options to retain (i.e., lock) the bottom portion of the sleeve to the base and the top portion of the sleeve to the cover. In some embodiments, these include: (1) a passive interference fit, and (2) an active latching mechanism (for example the optional clip). In some embodiments, the passive interference fit lock generally creates an engagement between the reusable sleeve and base and cover. In some embodiments, the active latching mechanism (the optional clip) locks them in place.

Figure 22:
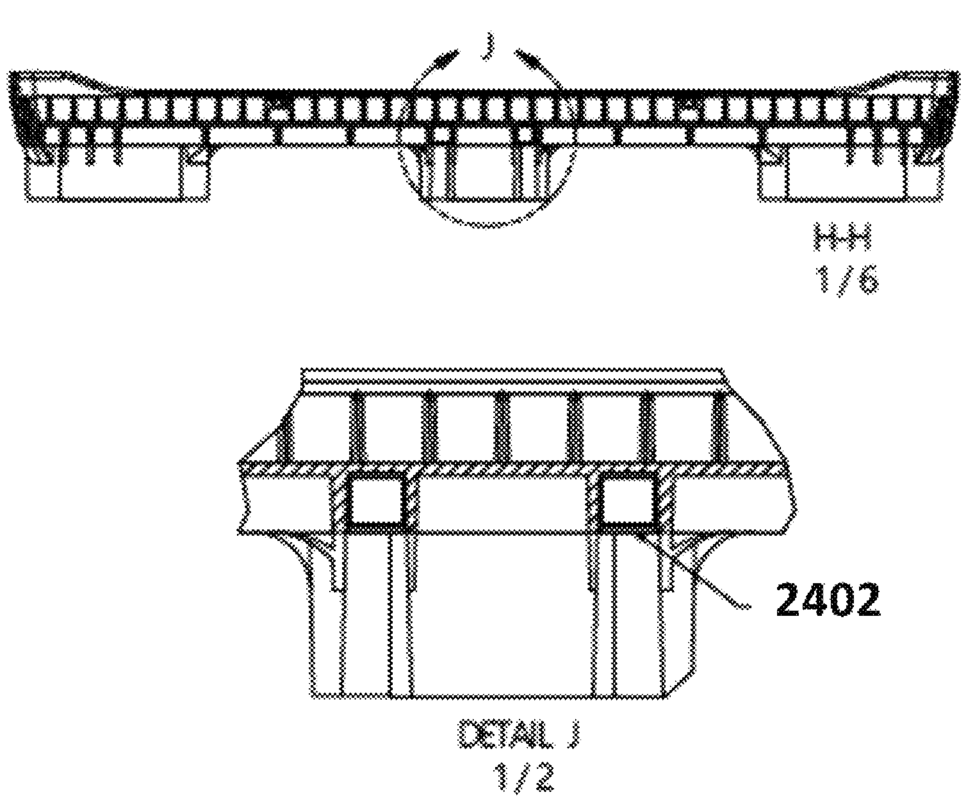
FIG. 22 is a schematic illustration of exemplary optional steel tubes and/or rods to reinforce the base, according to some embodiments of the invention.

In some embodiments, the base 102 optionally comprises one or more steel tubes and/or rods 2402 to reinforce the base 102, as schematically shown in FIG. 22.

In some embodiments, the base 102 comprises one or more elevating feet 2502 configured to be inserted on dedicated places 2504 (in FIG. 4*c* for example) the bottom surface of the base 102, as also shown for example in FIGS. 1*b* and 3*e*.

In some embodiments, the elevating legs 2502 are as shown for example in FIGS. 23*a-j*. In some embodiments, the legs are components attached to the bottom surface of the base and are configured to provide a space between the base and the floor on which the transport system is positioned. In some embodiments, the components attached to the bottom, for example the legs, are attached using snaps 2504 as shown for example in FIGS. 23*e-j*. In some embodiments, the components attached to the bottom are attached and/or connected to the bottom of the base by means of a cam, as will be further disclosed below. It should be understood that these images are exemplary images only, provided to allow a person having skills in the art to reproduce the invention. Other elevating feet could be used and should be understood that those are also meant to be included in scope of the invention.

In some embodiments, as mentioned before, the transport system 100 is configured to be stackable on top one another, as shown for example in FIGS. 24*a* and 24*b*. In some embodiments, the transport system 100 is configured to be stackable on top one another in either the fully deployed configuration (FIG. 24*a*) or in the folded configuration (FIG. 24*b*).

Figure 25B:
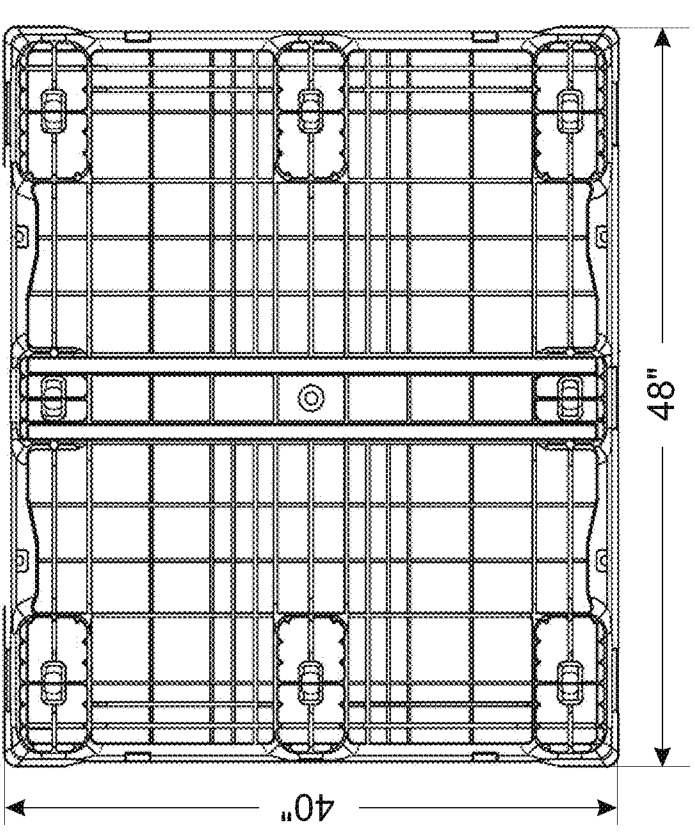
FIGS. 25*a-b* are schematic illustration showing exemplary measurements of an exemplary transport system, according to some embodiments of the invention.
Figure 25A:
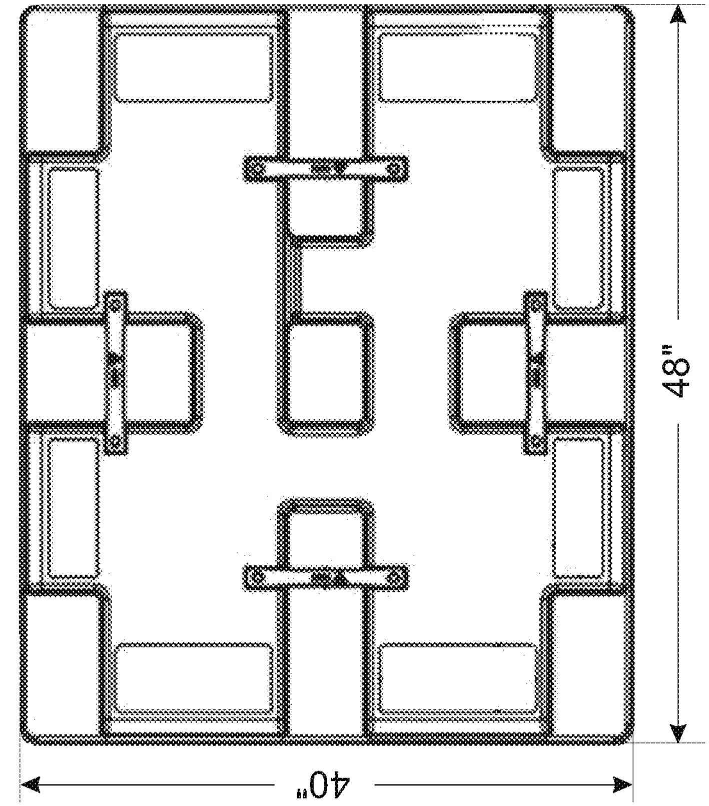

In some embodiments, the transport system 100 comprises exemplary measurements as shown for example in FIGS. 25*a-b*. It should be understood that these measures are exemplary measures only, provided to allow a person having skills in the art to reproduce the invention. Other measures could be used and should be understood that those are also meant to be included in scope of the invention.

Exemplary Cam and Cam Connection to the Base

Referring now to FIGS. 26*a-e*, showing schematic representations of cam 2600, according to some embodiments of the invention. In some embodiments, bottom components are connected and/or attached to the bottom of the base by means of a cam 2600. In some embodiments, the cam 2600 comprises a head 2602, a body 2604 and a leg 2606. In some embodiments, the head 2602 comprises one or more grooves 2608 configured to allow a user to reversibly actuate the cam 2600 from an open configuration to a close configuration and vice versa (see below). In some embodiments, the head 2602 is the widest portion of the cam 2600. In some embodiments, the head 2602 and the leg 2606 comprise the same width and/or radius. In some embodiments, the cam is made of one or more of the following materials: Thermoplastic materials, for example: Polyolefins (reinforced or not), Poliamide (reinforced or not), and metallic materials, for example, Aluminum and steel.

In some embodiments, below the head 2602, adjacent to the connection of the head 2602 and the body 2604, there is an isolation element 2610. In some embodiments, the isolation element 2610 is made of rubber. In some embodiments, the isolation element 2610 is made of one or more of the following materials: Rubber, Silicone, EPDM, LDPE, TPE, TPV and PUR. In some embodiments, the isolation element 2610 is made of a flexible material that allows a compression of the thickness of the isolation element 2610 by user during the insertion of the cam 2600. In some embodiments, the compression of the thickness is from about 10% to about 40% of the thickness of the isolation element 2610. Optionally from about 8% to about 50% of the thickness of the isolation element 2610. Optionally from about 5% to about 60% of the thickness of the isolation element 2610. Optionally more than 60% of the thickness of the isolation element 2610. In some embodiments, the compression is from about 1 mm to about 3 mm. Optionally from about 0.5 mm to about 5 mm. Optionally from about 0.1 mm to about 10 mm. In some embodiments, the isolation element 2610 is as wide as the head 2601. In some embodiments, the isolation element 2610 comprises a radius which is smaller than the radius of the head 2602. In some embodiments, the isolation element 2610 is configured to perform one or more of the following roles: block the passage of materials from one side of the cam 2600 to the other, restrict unwanted rotation of the cam 2600 and push the locking mechanism 2616 into the locked position (see below). In some embodiments, a potential advantage of the isolation element 2610 is one or more of the following:

1. During use of the transportation system, the system may be exposed to the elements, for example, water from rain, water on the floor where the transport system is positioned, dust, etc. Those elements might damage the contents being transported in the transportation system. In some embodiments, the isolation element 2610 blocks the water, and any other material (like dust) from passing over the opening 2620 for the cam 2600 in the bottom components, potentially keeping those materials from entering the inside of the transportation system, therefore potentially protecting the contents of the transportation system from the potentially damaging materials.

2. During the insertion of the cam 2600 into position, the thickness of the isolation element 2610 is reversibly pushed/compressed by the user, while rotating the cam 2600 from an open configuration to a close configuration. In some embodiments, once the user releases the cam 2600, the isolation element 2610 decompresses, pushing outwards the cam 2600. In some embodiments, this allows the locking of the locking mechanism 2616 of the cam 2600 into position (see below) and while staying in the uncompressed configuration, potentially avoids unwanted opening of the cam 2600.

3. After the insertion of the cam 2600 into position, the isolation element 2610 holds the cam 2600 in position by means of friction created between the isolation element 2610 and the bottom part of the base (2626—see below), therefore potentially avoiding unwanted rotation of the cam 2600 and unwanted release of the bottom components form the base.

In some embodiments, the body 2604 is an elongated body, optionally a cylindrical elongated body. In some embodiments, the body 2604 optionally comprises a protrusion 2612 configured to provide tactile feedback to the user that the can 2600 has passed a certain point in the insertion of the cam 2600. In some embodiments, in case of unwanted release of the cam 2600, the protrusion 2612 is configured to hold the cam 2600 within the cam housing 2618 (see below) in the bottom component. In some embodiments, the protrusion 2612 extends over the whole circumference of the leg 2604. In some embodiments, the protrusion 2612 extends partially over one or more parts of the circumference of the leg 2604.

In some embodiments, the leg 2606 is configured as a flat body 2614 extending towards one or more sides of the body 2604 of the cam 2600. In some embodiments, the leg 2606 comprises one flat body 2614. In some embodiments, the leg 2606 comprises two flat bodies 2614, as shown for example in FIG. 26*a*-*b*. In some embodiments, the leg 2606 comprises more than two flat bodies 2614. In some embodiments, the one or more flat bodies 2614 are completely flat, meaning they do not comprise any angle with respect to a longitudinal axis of the body 2604. In some embodiments, the one or more flat bodies 2614 are exactly 90 degrees in relation to a longitudinal axis of the cam 2600. In some embodiments, this is to avoid having a thread-like configuration of the flat body 2614 in relation to one or more of the head 2606 and the side openings 2622 of the cam housing 2618. In some embodiments, the flat body 2614 does not have a thread-like configuration. In some embodiments, the one or more flat bodies 2614 are configured to match one or more side openings 2622 in a cam housing 2618 in the bottom component (see below). In some embodiments, the leg 2606 comprises one or more locking mechanism 2616 on the flat bodies 2614. In some embodiments, the locking mechanism 2616 are one or more protrusions 2616 located on the flat surface of the flat body 2614. In some embodiments, the one or more protrusions 2616 extend from a distal end of the flat body 2614, meaning from the outside side of cam 2600, towards the inside of the cam 2600, until it reaches the body 2604. In some embodiments, the one or more protrusions 2616 extend partially over the surface of the flat body 2614. In some embodiments, the one or more protrusions 2616 are configured to enter one or more grooves 2624 located in the cam housing 2618 (see below).

Figures 26A, 26B, 26C, 26D, 26E:
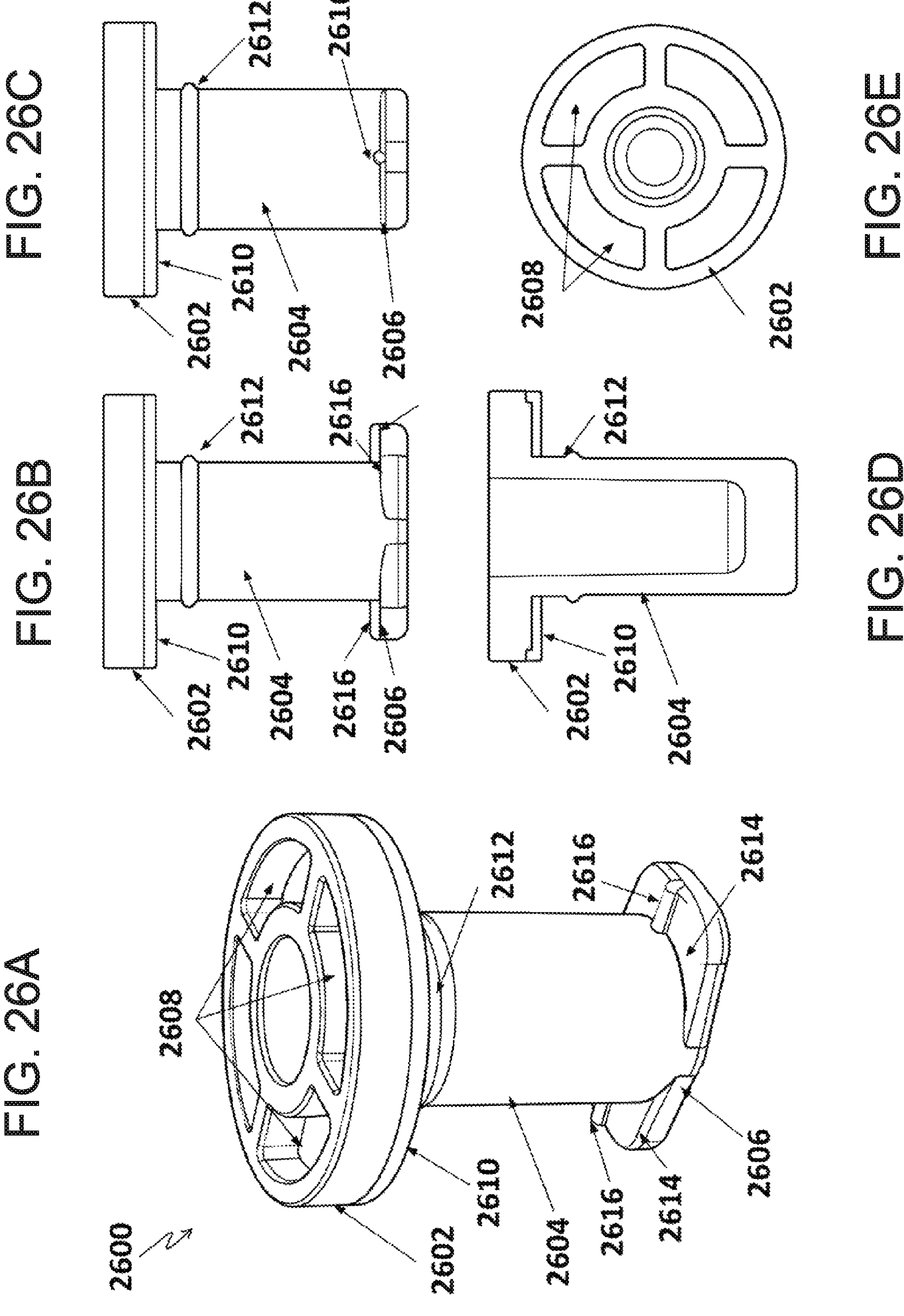
FIGS. 26*a-e* are schematic representations of cam, according to some embodiments of the invention.
Figure 26F:
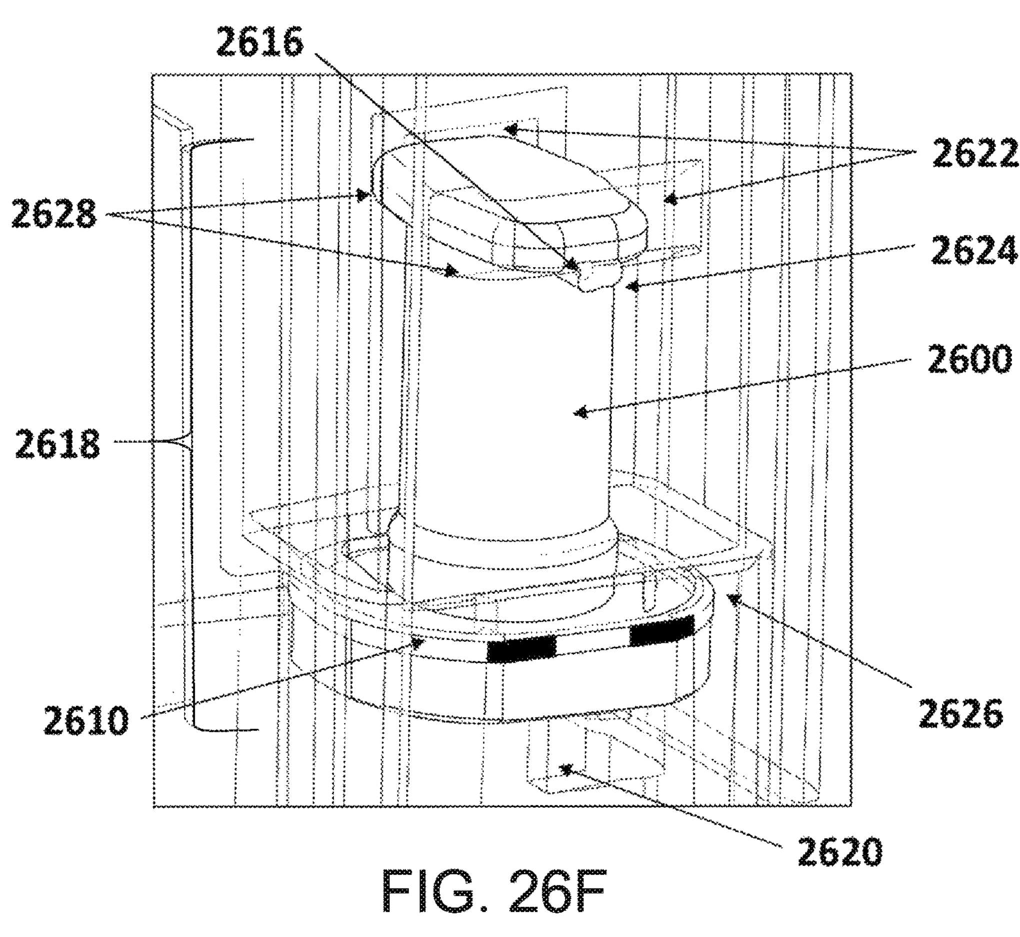
FIGS. 26*f-g* are schematic representations of an exemplary cam in an exemplary cam housing, according to some embodiments of the invention.
Figure 26G:
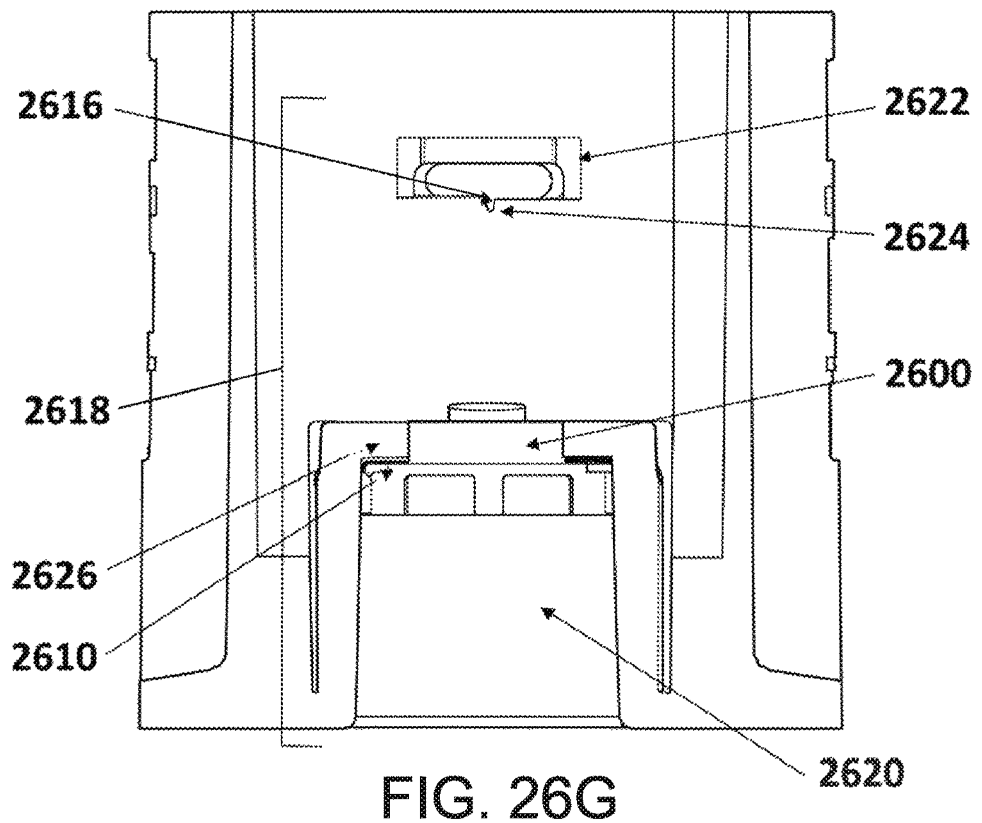

Referring now to FIGS. 26*f*-*g*, showing schematic representations of an exemplary cam 2600 in an exemplary cam housing 2618, according to some embodiments of the invention. In some embodiments, bottom components comprise one or more cam housings 2618 each configured to receive a cam 2600. In some embodiments, the cam housing 2618 comprises an elongated opening 2620 configured to allow the insertion of the cam 2600. In some embodiments, the cam housing 2618 comprises one or more side openings 2622 configured to allow the insertion of the one or more flat bodies 2614 of the cam 2600. In some embodiments, the one or more side openings comprise one or more groves 2624 configured to receive the one or more protrusions 2616 of the locking mechanism of the cam 2600. In some embodiments, the cam housing 2618 comprises an internal wall 2626 configured to meet the isolation element 2610 during the insertion and to limit the length of the insertion of the cam 2600 in the cam housing 2618. In some embodiments, the one or more of the surfaces of the one or more side openings comprise one or more angled surfaces 2628, as shown for example in FIG. 26*f*. In some embodiments, the angled surfaces 2628 are located on the bottom part of the side opening 2622. In some embodiments, the angled surfaces 2628 are configured to assist directing the one or more flat bodies 2614 towards the one or more side openings 2622 and the one or more protrusions 2616 towards the one or more groves 2624. In some embodiments, the angled surfaces 2628 are configured to assist in the rotation of the cam 2600 from an open configuration to a close configuration. In some embodiments, during the rotation of the cam 2600 from an open configuration to a close configuration, as assisted by the angled surfaces 2628, the isolation element 2610 is compressed. In some embodiments, when the one or more protrusions 2616 meet the one or more groves 2624 the isolation element 2610 is provided the necessary space to decompress (see below).

Figure 26H:
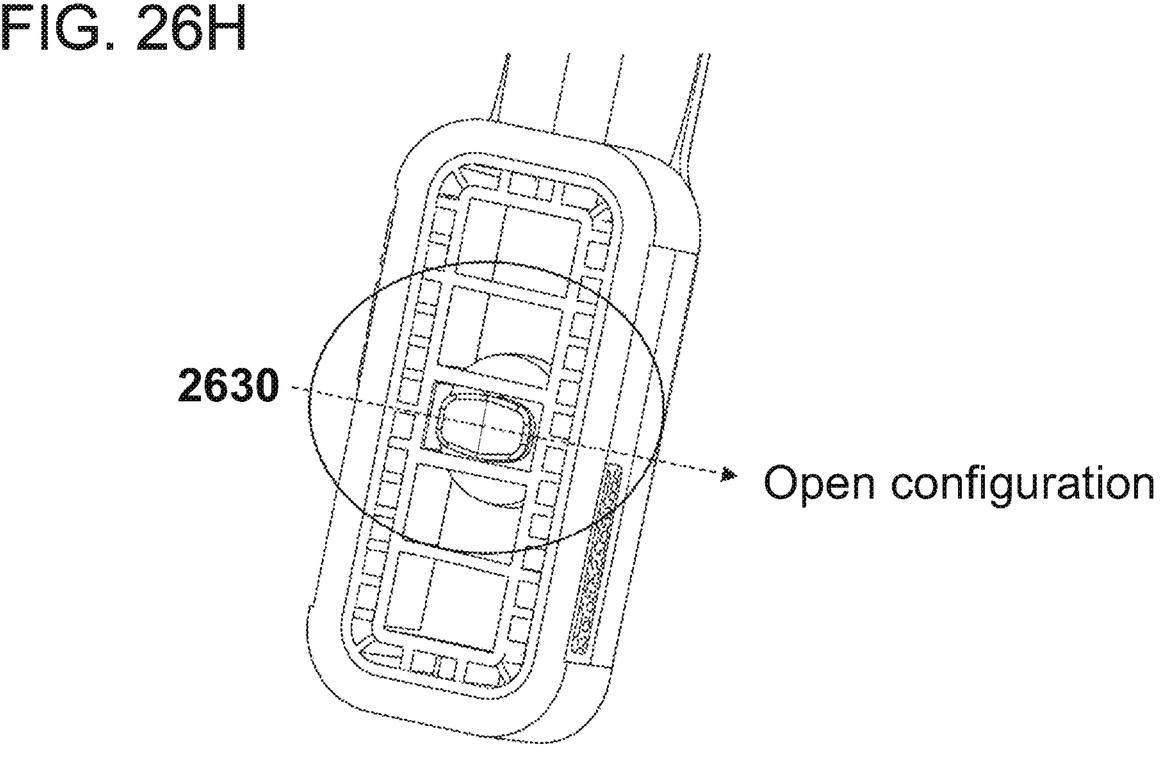
FIGS. 26*h-i* are schematic representations of an exemplary cam 2600 in an open configuration and in a close configuration, respectively, according to some embodiments of the invention.
Figure 26I:
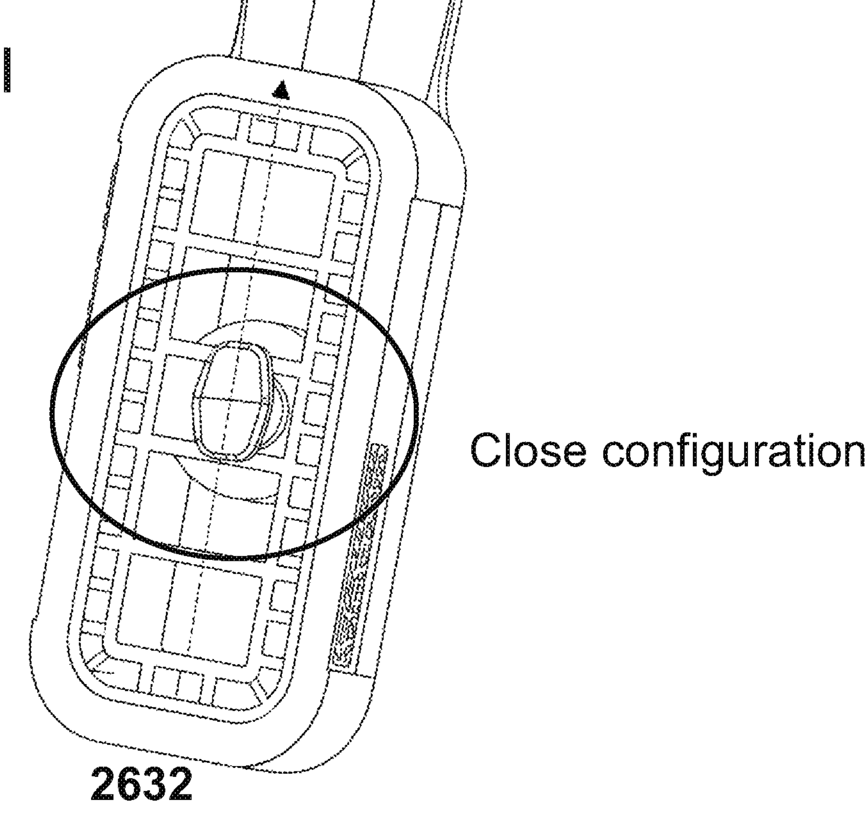

Referring now to FIGS. 26*h*-*i*, showing schematic representations of an exemplary cam 2600 in an open configuration and in a close configuration, respectively, according to some embodiments of the invention. In some embodiments, in an open configuration the one or more flat bodies 2614 are directed in one direction 2630, as shown for example in FIG. 26*h*. In some embodiments, rotation of the cam 2600 causes the change from the open configuration to the close configuration, which can be evidenced by the change in the direction 2632 of the one or more flat bodies 2614, as shown for example in FIG. 26*i*.

Exemplary Methods

Figures 27A, 27B, 27C, 27D:
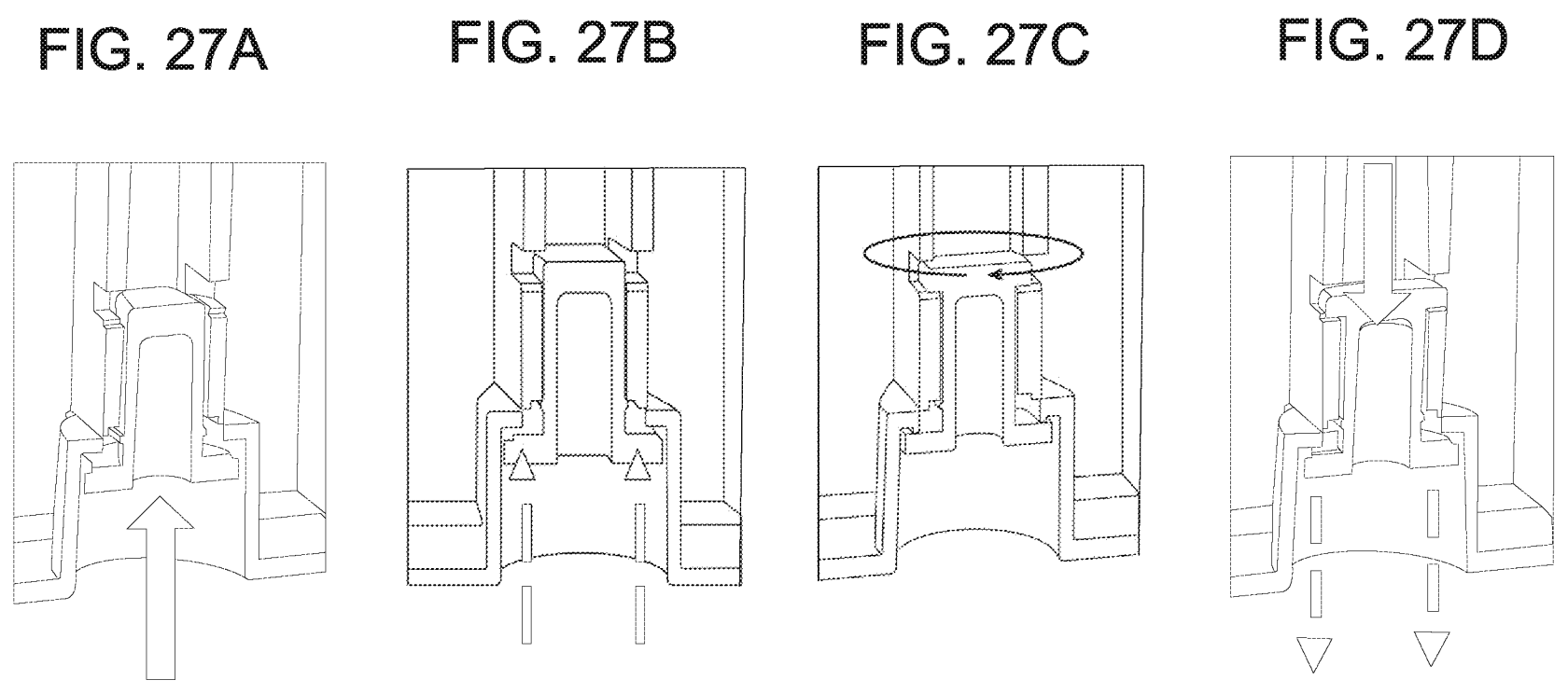
Figure 28:
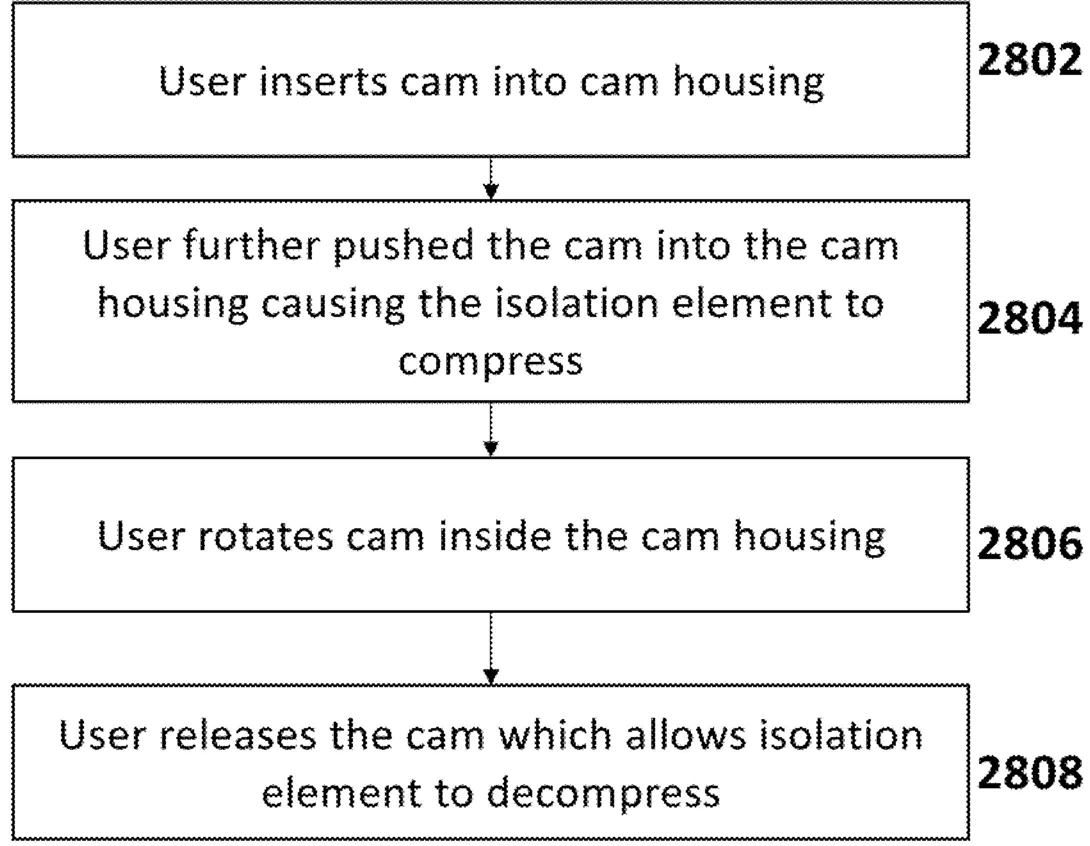
FIG. 28 is a flowchart of an exemplary method, according to some embodiments of the invention.

Referring now to FIGS. 27*a*-*d*, showing schematic representations of the actions performed when installing the cam, according to some embodiments of the invention, and further referring to FIG. 28, showing a flowchart of an exemplary method, according to some embodiments of the invention. In some embodiments, the user performs the following actions when using the cam:

1. In some embodiments, the user inserts the cam into the cam housing 2802, as shown in FIG. 27*a*.
2. In some embodiments, the user further pushes the cam into the cam housing 2804 causing the isolation element to compress, as shown for example in FIG. 27*b*.
3. In some embodiments, the user rotates the cam inside the cam housing 2806 until the protrusion of the locking mechanism meets the groove of the cam housing, as shown for example in FIG. 27*c*.
4. In some embodiments, the user releases the cam 2808, which allow the isolation element to decompress and the protrusion of the locking mechanism of the cam to remain inside the groove of the cam housing.

Exemplary Window Flap

Figure 29A:
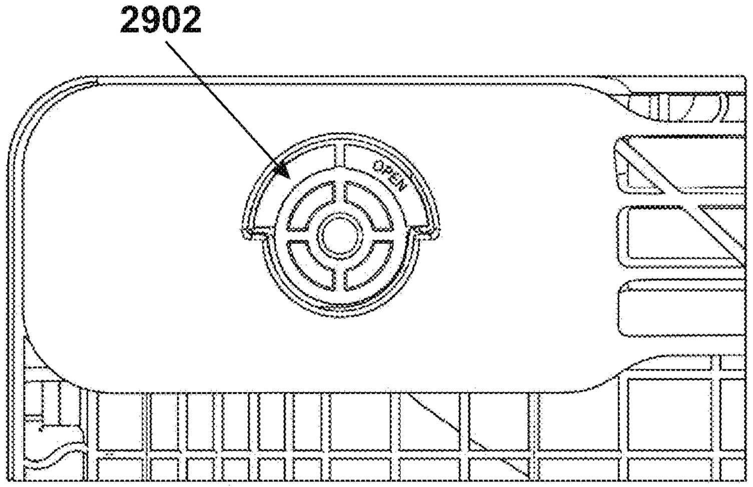
FIG. 29*a-b* are schematic representations of an optional window flap, according to some embodiments of the invention.
Figure 29B:
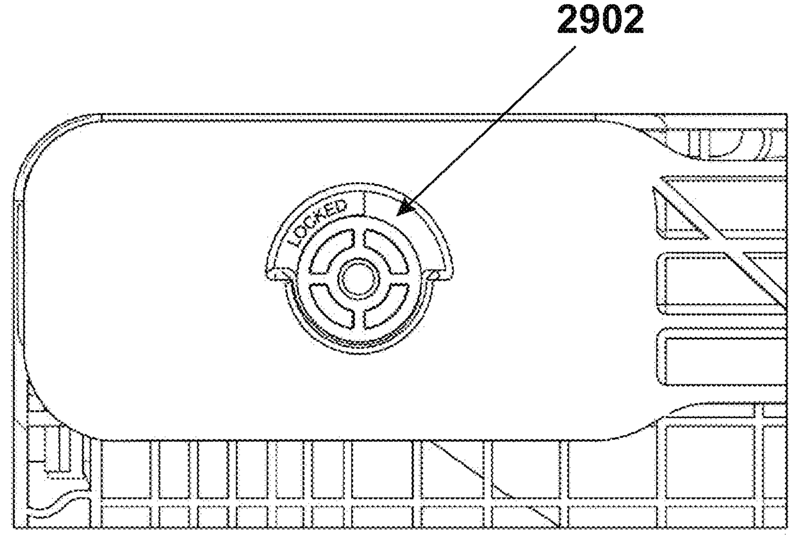

Referring now to FIGS. 29*a*-*b*, showing schematic representations of an optional window flap, according to some embodiments of the invention. In some embodiments, the cam comprises a window flap 2902 attached and/or in communication with the head of the cam. In some embodiments, the window flap 2902 is configured to hide a written descriptor located on the surface of the cam housing. For example, in FIG. 29*a*, the window flap 2902 is on the left side covering the descriptor "LOCKED" and allowing the user to see the descriptor "OPEN". In some embodiments, this allows the user to see the status of the cam in the cam housing, which in FIG. 29*a* is "OPEN", which means that the cam can be extracted from the cam housing.

Opposite to this, in FIG. 29*b*, the window flap 2902 is on the right side covering the descriptor "OPEN" and allowing the user to see the descriptor "LOCKED". In some embodiments, this allows the user to see the status of the cam in the cam housing, which in FIG. 29*b* is "LOCKED", which means that the cam cannot be extracted from the cam housing.

Exemplary Dimensions of the Cam

Figure 30:
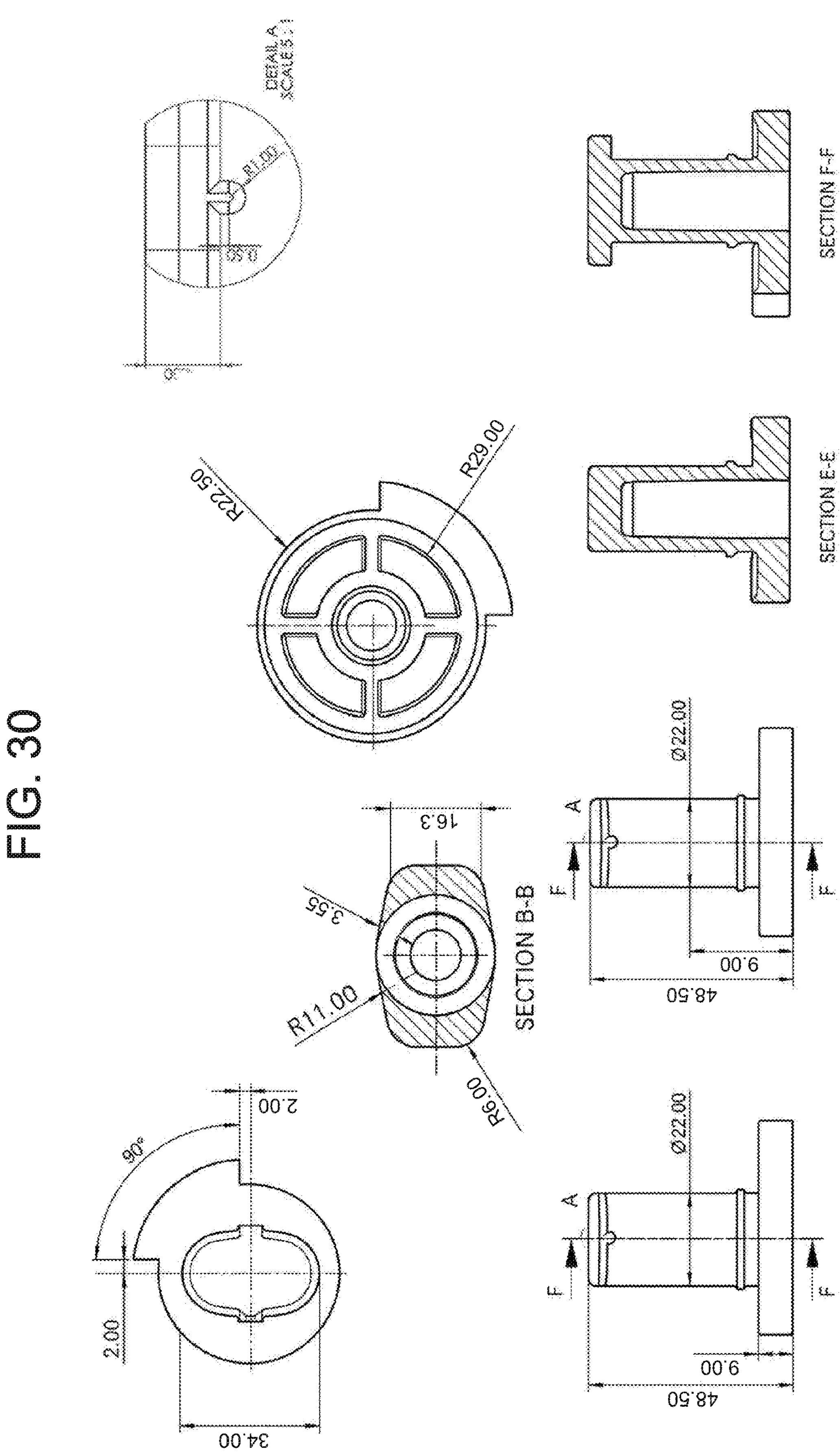
FIG. 30 are schematic representations of the cam with a flap window and its exemplary dimensions, according to some embodiments of the invention.

Referring now to FIG. 30, showing schematic representations of the cam with a flap window and its exemplary dimensions, according to some embodiments of the invention. In some embodiments, the cam of the present invention comprises the dimensions as disclosed in FIG. 30. It should be understood that these dimensions are provided to allow a person having skills in the art to understand the invention and are not intended to be limiting in any way.

Exemplary Flat Cam

Figure 31A:
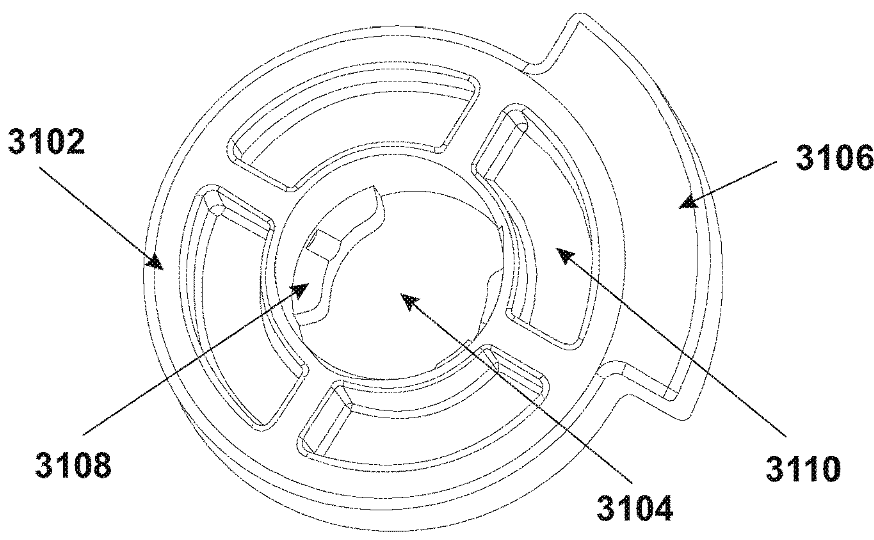
FIGS. 31*a-c* are schematic representations of an exemplary flat cam, according to some embodiments of the invention.
Figure 31B:
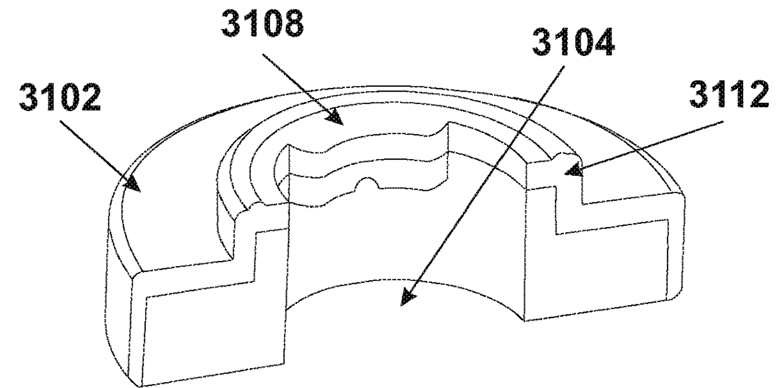
Figure 31C:
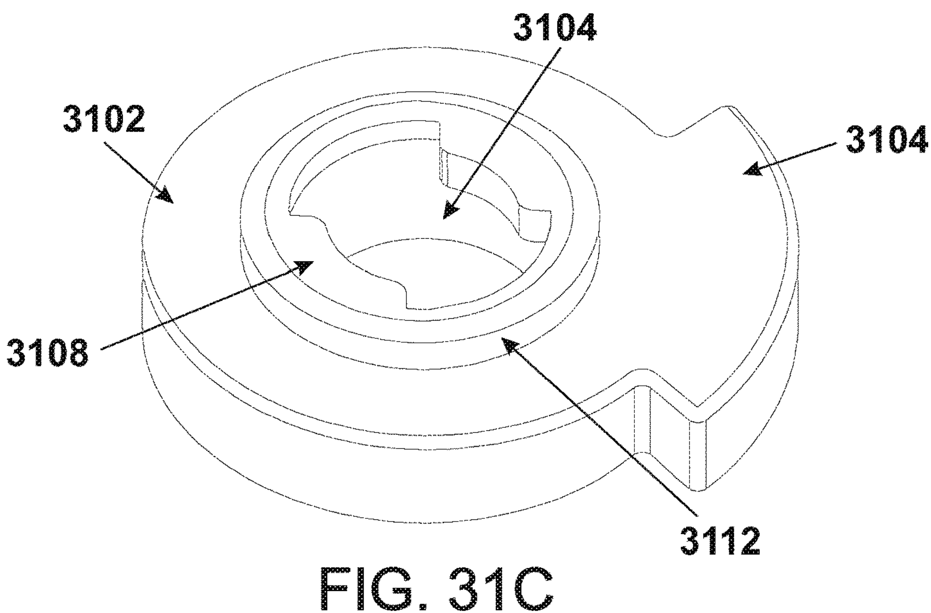

Referring now to FIGS. 31*a-c* showing schematic representations of an exemplary flat cam, according to some embodiments of the invention. In some embodiments, instead of having a "male"-type cam, the transport system uses "female"-type cam, also referred herein as flat cam 3100. In some embodiments, the flat cam comprises a fat body 3102, optionally round or oval, comprising an opening 3104 at the center. In some embodiments, similar to the cam as disclosed above, the flat cam comprises a window flap 3106 attached and/or in communication with the body of the flat cam. In some embodiments, the window flap 3106 is configured to hide a written descriptor located on the surface of the cam housing, as shown for example in FIGS. 33*a-b*. In some embodiments, the flat cam comprises one or more protrusions 3108 extending towards the center of the opening 3104. In some embodiments, the one or more protrusions 3108 are configured to engage the "male" part 3200 (as shown for example in FIG. 32) in the base. In some embodiments, optionally, the top surface (as shown for example in FIG. 31*a*) of the flat cam comprises one or more grooves 3110 configured to allow a user to reversibly actuate the flat cam 3100 from an open configuration to a close configuration and vice versa. In some embodiments, optionally, the bottom surface (as shown for example in FIGS. 31*b* and/or 31*c*) comprises protruding portion 3112 around the opening 3104, configured to engage the top portion of the "male" part 3200 (as shown for example in FIG. 32) in the base while the un-protruded portion holds the part 3402 that is being held by the flat cam in place (as shown for example in FIG. 34—see below).

Figure 32:
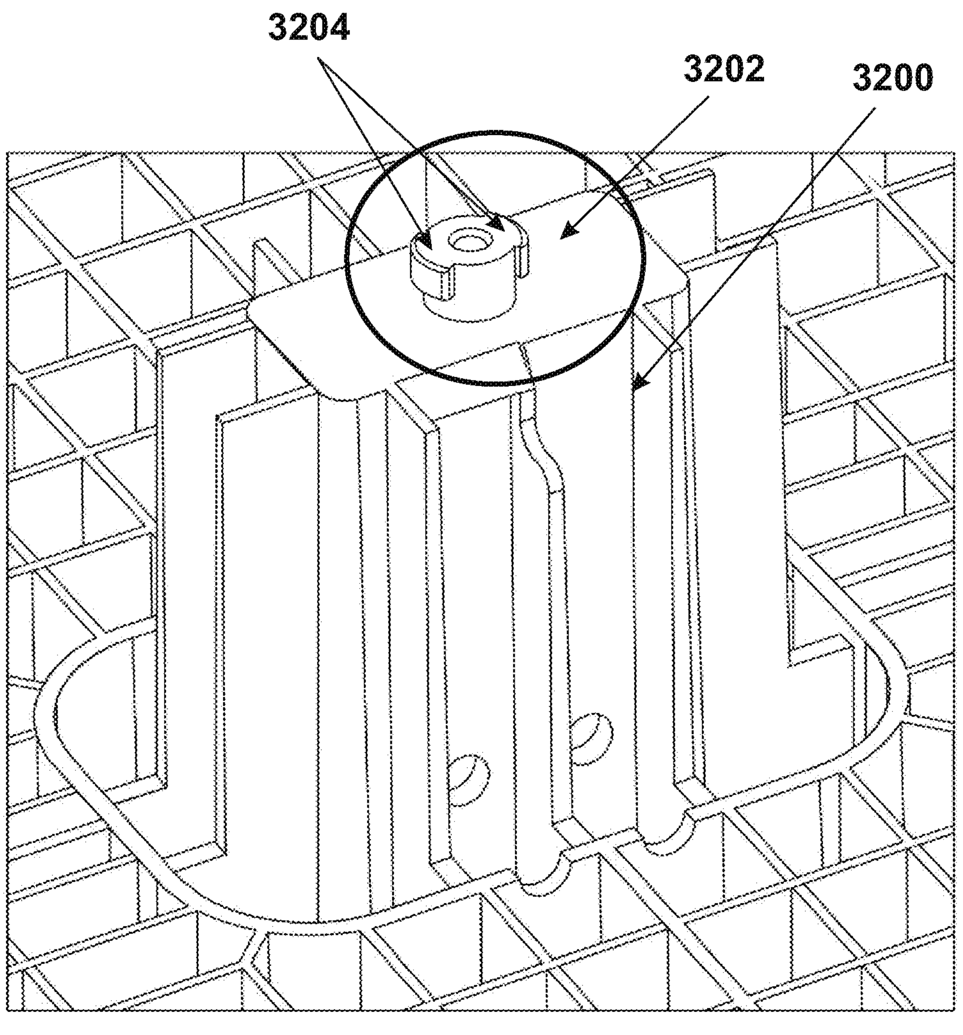
FIG. 32 is a schematic representation of an exemplary male part located in base which connects with an exemplary flat cam, according to some embodiments of the invention.
Figure 33A:
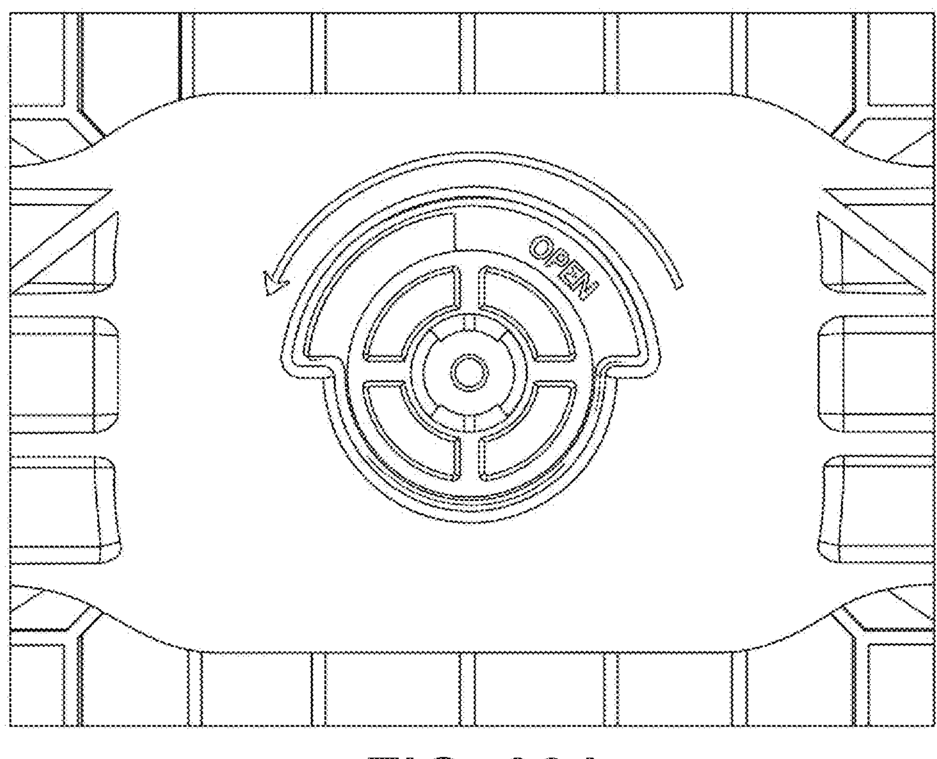
FIGS. 33*a-b* are schematic representations of an exemplary flat cam in an open and locked configuration, according to some embodiments of the invention.
Figure 33B:
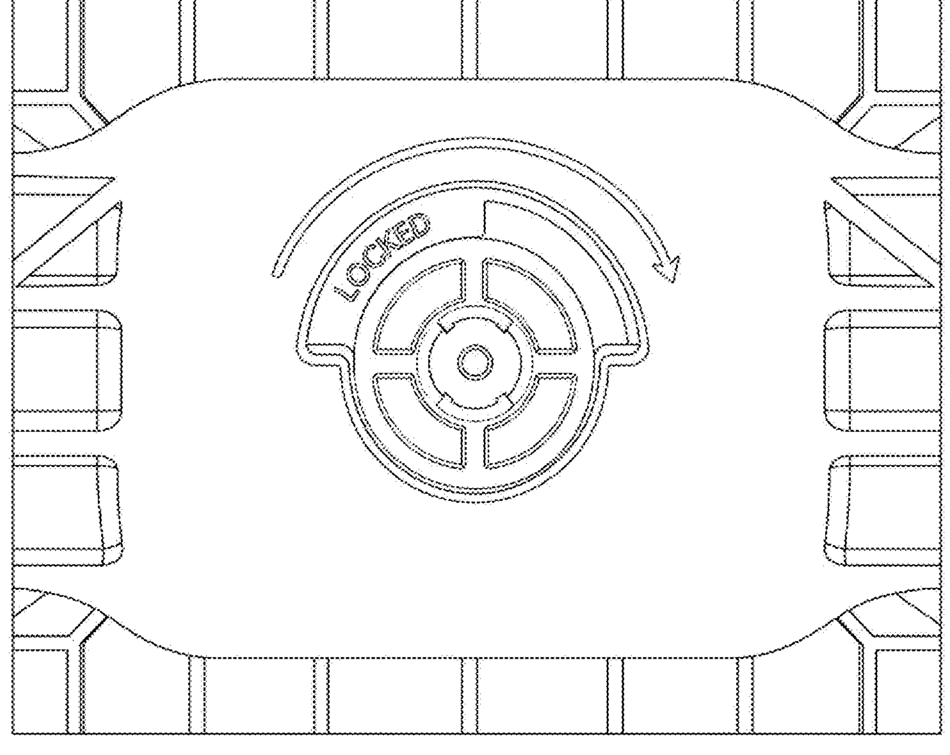

Referring now to FIG. 32 showing a schematic representation of an exemplary male part located in base which connects with an exemplary flat cam, according to some embodiments of the invention. In some embodiments, the "male" part 3200 in the base comprises a connector 3202 sized and shaped to enter the opening 3104 in the flat cam 3100. In some embodiments, the connector 3202 comprises one more protrusions 3204 configured to engage the protrusions 3108 in the flat cam 3100 when the flat cam 3100 is rotated from an open configuration to a locked configuration (as shown for example in FIGS. 33*a*-33*b*).

Figure 34:
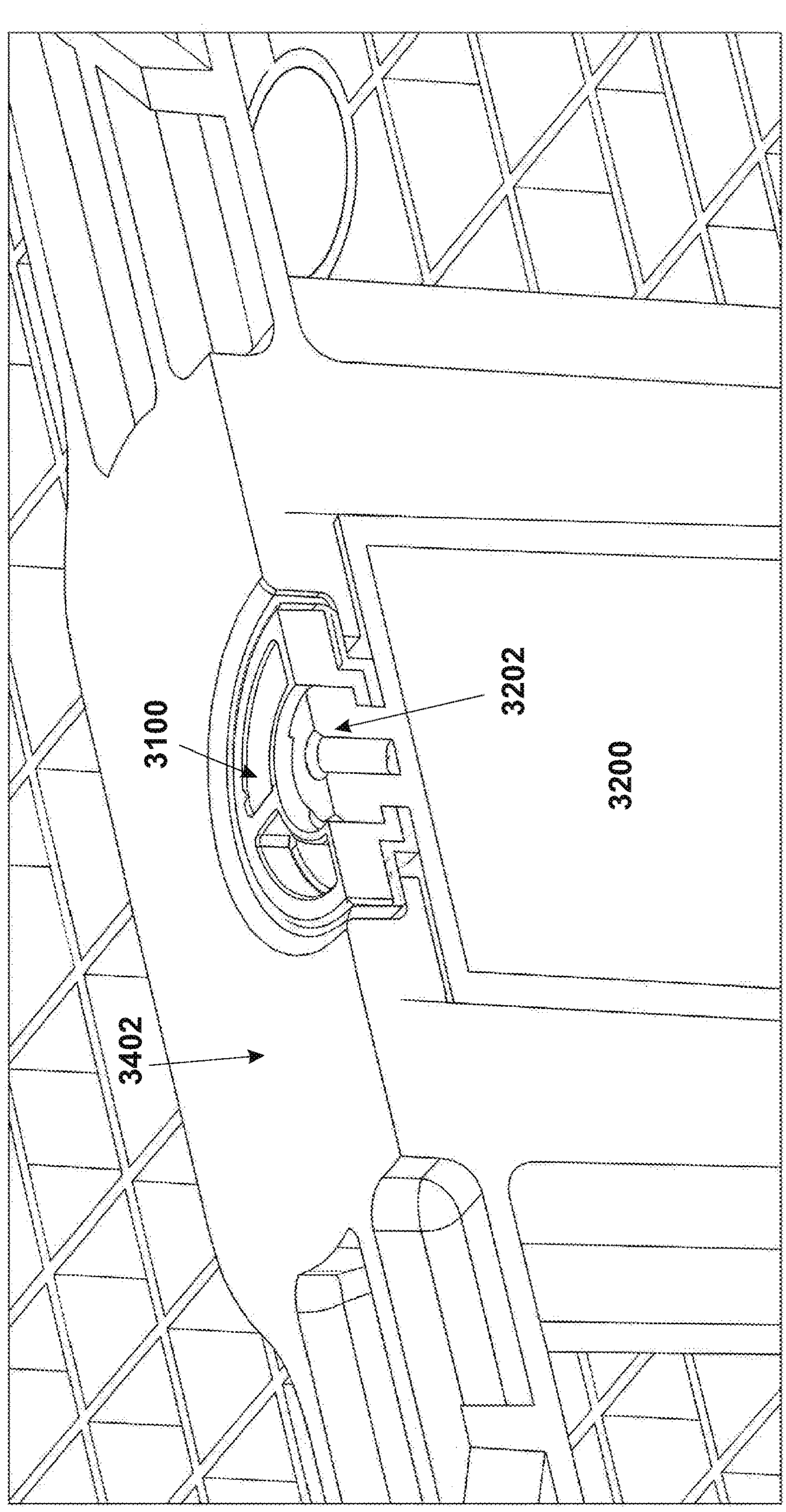
FIG. 34 is a schematic representation of a part of an exemplary base with the flat cam engaged, according to some embodiments of the invention.

Referring now to FIG. 34 showing a schematic representation of a part of an exemplary base with the flat cam engaged, according to some embodiments of the invention. In some embodiments, as explained above, the base comprises a "male" part 3200. In some embodiments, an additional part 3402 is mounted on the base. In some embodiments, the user then positions the flat cam 3100 in the area of the additional part 3402 dedicated for the flat cam 3100 and rotates the flat cam to bring it from an open configuration to a locked configuration, thereby holding the additional part 3402 attached to the base.

Exemplary Isolation Element

Figure 35:
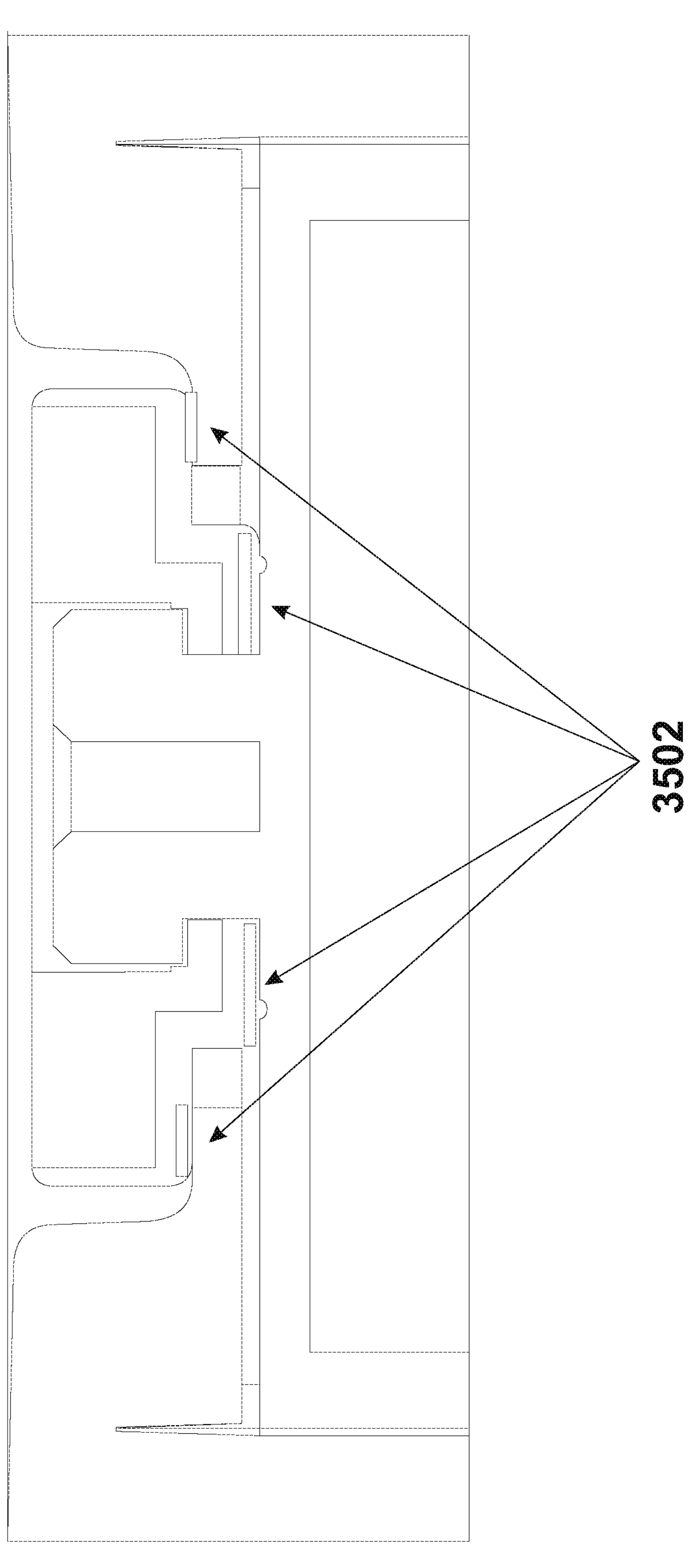
FIG. 35 is a schematic representation of an isolation element in an exemplary flat cam, according to some embodiments of the invention.

Referring now to FIG. 35 showing a schematic representation of an isolation element in an exemplary flat cam, according to some embodiments of the invention. In some embodiments, the bottom surfaces of the flat cam comprise one or more isolation elements 3502. In some embodiments, the isolation element 3502 is made of rubber. In some embodiments, the isolation element 3502 is made of one or more of the following materials: Rubber, Silicone, EPDM, LDPE, TPE, TPV and PUR. In some embodiments, the isolation element 3502 is made of a flexible material that allows a compression of the thickness of the isolation element 3502 by user during the insertion of the flat cam 3100. In some embodiments, the compression of the thickness is from about 10% to about 40% of the thickness of the isolation element 3502. Optionally from about 8% to about 50% of the thickness of the isolation element 3502. Optionally from about 5% to about 60% of the thickness of the isolation element 2610. Optionally more than 60% of the thickness of the isolation element 3502. In some embodiments, the compression is from about 1 mm to about 3 mm. Optionally from about 0.5 mm to about 5 mm. Optionally from about 0.1 mm to about 10 mm. In some embodiments, the isolation element 3502 is as wide as the bottom surface of the flat cam. In some embodiments, the isolation element 2610 comprises a radius which is smaller than the radius of the head 2602. In some embodiments, the isolation element 2610 is configured to perform one or more of the following roles: block the passage of materials from one side of the flat cam 3100 to the other, restrict unwanted rotation of the flat cam 3100. In some embodiments, a potential advantage of the isolation element 3502 is one or more of the following:

1. During use of the transportation system, the system may be exposed to the elements, for example, water from rain, water on the floor where the transport system is positioned, dust, etc. Those elements might damage the contents being transported in the transportation system. In some embodiments, the isolation element 3502 blocks the water, and any other material (like dust) from passing over the opening 3104 for the flat cam 3100 in the bottom components, potentially keeping those materials from entering the inside of the transportation system, therefore potentially protecting the contents of the transportation system from the potentially damaging materials.

2. During the insertion of the flat cam 3100 into position, the thickness of the isolation element 3502 is reversibly pushed/compressed by the user, while rotating the flat cam 3100 from an open configuration to a close configuration. In some embodiments, once the user releases the flat cam 3100, the isolation element 3502 decompresses, pushing outwards the flat cam 3100.

3. After the insertion of the flat cam 3100 into position, the isolation element 3502 holds the flat cam 3100 in position by means of friction created between the isolation element 3502 and the bottom part of the base, as shown for example in FIG. 34 and FIG. 35, therefore potentially avoiding unwanted rotation of the flat cam 3100 and unwanted release of the bottom components form the base.

It is expected that during the life of a patent maturing from this application many relevant transport systems comprising bases, sleeves and covers will be developed; the scope of the terms base, sleeve, cover, groove, extensions are intended to include all such new technologies a priori.

As used herein with reference to quantity or value, the term "about" means "within ±20% of".

The terms "comprises", "comprising", "includes", "including", "has", "having" and their conjugates mean "including but not limited to".

The term "consisting of' means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular forms “a”, “an” and “the” include plural references unless the context clearly dictates otherwise. For example, the term “a compound” or “at least one compound” may include a plurality of compounds, including mixtures thereof.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as “from 1 to 6” should be considered to have specifically disclosed subranges such as “from 1 to 3”, “from 1 to 4”, “from 1 to 5”, “from 2 to 4”, “from 2 to 6”, “from 3 to 6”, etc.; as well as individual numbers within that range, for example, 1, 2, 3, 4, 5, and 6. This applies regardless of the breadth of the range.

Whenever a numerical range is indicated herein (for example “10-15”, “10 to 15”, or any pair of numbers linked by these another such range indication), it is meant to include any number (fractional or integral) within the indicated range limits, including the range limits, unless the context clearly dictates otherwise. The phrases “range/ranging/ranges between” a first indicate number and a second indicate number and “range/ranging/ranges from” a first indicate number “to”, “up to”, “until” or “through” (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A cam configured to enter angled surfaces of one or more side openings in a cam housing, the one or more side openings comprising one or more grooves, the cam comprising:

a. a head;

b. a body connected to said head; and c. a leg comprising one or more flat bodies extending perpendicular to said body;

wherein said cam further comprises at least one compressible isolation element located below said head and extending at least partially around said body;

wherein each of said one or more flat bodies comprises a locking mechanism comprising a first protrusion; said first protrusion facing said head, wherein said first protrusion is an elongated protrusion extending from a distal end of said one or more flat bodies towards said body, wherein said one or more flat bodies is configured to enter the angled surfaces of the one or more side openings in the cam housing and said first protrusion is configured for entering the one or more grooves in the one or more side openings, thereby locking the cam in the cam housing;

wherein said body further comprises a second protrusion located below said head and said at least one compressible isolation element; said second protrusion extends over at least a part of a circumference of said body; said second protrusion is configured for holding said cam within the cam housing when inserted in the cam housing.

2. The cam according to claim 1, wherein when the cam is entered into the cam housing said at least one compressible isolation element is configured to compress a distance of from about 0.5 mm to about 3 mm.

3. The cam according to claim 1, wherein when the cam is entered into the cam housing said at least one compressible isolation element is configured to compress a percentage of its own thickness of from about 20% to about 60%.

4. The cam according to claim 1, wherein said at least one compressible isolation element extends completely around said body.

5. The cam according to claim 1, wherein said body is an elongated cylindrical body.

6. The cam according to claim 1, wherein said head comprises one or more grooves on a surface of said head for allowing actuation of said cam by a user.

7. The cam according to claim 1, wherein said one or more flat bodies extend perpendicular to said body.

8. The cam according to claim 1, wherein said cam is used in a transport system to hold one or more components to said transport system.

9. The cam according to claim 1, wherein said cam is made of one or more of thermoplastic materials and metallic materials.

10. The cam according to claim 9, wherein said thermoplastic materials comprise polyolefins (reinforced or not) or poliamide (reinforced or not).

11. The cam according to claim 9, wherein said metallic materials comprise aluminium or steel.

12. The cam according to claim 1, wherein said at least one compressible isolation element is made of one or more of the following materials rubber, silicone, Ethylene Propylene Diene Monomer (EPDM), Low-Density Polyethylene (LDPE), thermoplastic elastomer (TPE), thermoplastic vulcanizates (TPV), and polyurethane (PUR).

13. The cam according to claim 1, wherein said one or more flat bodies are configured to translate over an angled surface of an opening of a cam housing.

14. The cam of claim 1, wherein said one or more flat bodies do not comprise any angle with respect to a longitudinal axis of the body.

15. A method of actuating a cam in a cam housing in a transport system, the method comprising:

a. inserting a cam according to claim 1 into a cam housing;

b. pushing said cam into said cam housing to cause a compression of an isolation element in said cam;

c. rotating said cam;

d. releasing said cam;

e. allowing decompression of said isolation element, which actuates a locking mechanism between said cam and said cam housing.

* * * * *